(12) United States Patent
Grover et al.

(10) Patent No.: US 8,446,815 B2
(45) Date of Patent: May 21, 2013

(54) FAILURE INDEPENDENT PATH PROTECTION WITH P-CYCLES

(75) Inventors: Wayne D. Grover, Edmonton (CA); Adil Kodian, Edmonton (CA)

(73) Assignee: Telecommunications Research Laboratories, Edmonton (CA)

( * ) Notice: Subject to any disclaimer, the term of this patent is extended or adjusted under 35 U.S.C. 154(b) by 768 days.

(21) Appl. No.: 11/317,908

(22) Filed: Dec. 22, 2005

(65) Prior Publication Data

US 2006/0164976 A1 Jul. 27, 2006

Related U.S. Application Data

(60) Provisional application No. 60/637,769, filed on Dec. 22, 2004.

(51) Int. Cl.
*G01R 31/08* (2006.01)

(52) U.S. Cl.
USPC ............ 370/216; 370/225; 709/224; 709/239

(58) Field of Classification Search
USPC .......... 370/216, 225, 351; 709/224, 234–236, 709/238–242
See application file for complete search history.

(56) References Cited

U.S. PATENT DOCUMENTS

| | | | | |
|---|---|---|---|---|
| 6,324,162 B1* | 11/2001 | Chaudhuri | ..................... | 370/225 |
| 6,404,734 B1* | 6/2002 | Stamatelakis et al. | ........ | 370/227 |
| 6,421,349 B1* | 7/2002 | Grover | .......................... | 370/408 |
| 6,914,880 B1* | 7/2005 | Grover et al. | ................. | 370/221 |
| 7,058,296 B2* | 6/2006 | Saniee et al. | ...................... | 398/3 |
| 7,230,916 B2* | 6/2007 | Stamatelakis et al. | ........ | 370/227 |
| 2004/0109407 A1* | 6/2004 | Grover et al. | ................. | 370/218 |
| 2004/0133663 A1* | 7/2004 | Grover et al. | ................. | 709/220 |

OTHER PUBLICATIONS

Doucette, J., et al., "On the Availability and Capacity Requirements of Shared Backup Path-Protected Mesh Networks," Optical Networks Magazine, Nov./Dec. 2003, pp. 29-44.

Kini, S., et al., "Shared Backup Label Switched Path Restoration," Internet Society: Internet Engineering Task Force, May 2001, <http://www.tools.ietf.org/html/draft-kini-restoration-shared-backup-01> [retrieved Jun. 2, 2009], 10 pages.

Xiong, Y., et al., "Achieving Fast and Bandwidth-Efficient Shared-Path Protection," Journal of Lightwave Technology 21(2):365-371, Feb. 2003.

* cited by examiner

*Primary Examiner* — Yemane Mesfin
*Assistant Examiner* — Mon Cheri Davenport
(74) *Attorney, Agent, or Firm* — Christensen O'Connor Johnson Kindness PLLC

(57) ABSTRACT

A telecommunications network, comprising plural nodes connected by plural spans and arranged to form a mesh network. There is at least one pre-configured cycle of spare capacity established in the mesh network, the pre-configured cycle including plural nodes of the mesh network. The plural nodes of the pre-configured cycle are configured to protect a set of plural mutually disjoint working paths end to end.

17 Claims, 15 Drawing Sheets

10 spare channels

10 × 1
+
9 × 2

= 28 working

Redundancy
= 35.7%

(1-8) RESTORATION  (2-5) RESTORATION

FAILURE INDEPENDENT PATH PROTECTION WITH P-CYCLES

CROSS-REFERENCE(S) TO RELATED APPLICATION(S)

This application claims the benefit under 35 U.S.C. §119(e) of U.S. Provisional Application No. 60/637,769, filed Dec. 22, 2004.

BACKGROUND

The background discussion proceeds as follows. First we recap the initial invention of p-cycles and briefly identify the most significant developments that have occurred since. The most relevant and closely related work, in terms of the driving motivation, to the present development will be that of "flow p-cycles" also known as segment-protecting p-cycles. We will therefore next discuss flow p-cycles in relatively more depth to show (as useful as that advance was and continues to be) how complex the basic problem is and how that work ultimately still failed to solve the failure dependence problem and realize a p-cycle equivalent to the SBPP scheme. We then review the SBPP scheme itself, to point out its properties. The special significance of SBPP is that in the field today, it is the pre-eminent current approach for path survivable optical networking. It is therefore relevant to appreciating the novelty and importance of FIPP p-cycles to show that all desirable properties of SBPP are also provided by FIPP p-cycles while the originally superior properties of p-cycles themselves are also retained. The following acronyms are used in this patent document: SBPP: Shared Backup Path Protection; BLSR: Bidirectional Line Switched Ring; ADM: Add Drop Multiplexer; MPLS: Multi-Protocol Label Switching; GMPLS: Generalized MPLS; IP: Internet Protocol; NEPC: Node Encircling p-Cycle; PWCE: Protected Working Capacity Envelope; PXT: Pre Cross Connected Trail; AIS: Alarm Inhibit Signal; LoS: Loss of Signal; OTDR: Optical Time Domain Reflectometry; SRLG: Shared Risk Link Group; APS: Automatic Protection Switching; DRS: Disjoint Route.

Basic P-Cycles and Related Advances to Date

The purpose of this section is to quickly recap background on p-cycles and the current state of the art with related advances on p-cycles. p-Cycles have some remarkably desirable properties but also some still-remaining shortcomings in certain regards. This review will make it apparent that despite several efforts so far, no extension to the basic p-cycles concept has yet fully addressed issues of node-failure restoration, achieving end-to-end path protection efficiency, and the desirability of not having to depend on for fault isolation.

P-Cycle History

Span protecting p-cycles, such as those described in W. D. Grover, D. Stamatelakis, "Cycle-Oriented Distributed Preconfiguration: Ring-like Speed with Mesh-like Capacity for Self-planning Network Restoration," *Proceedings of IEEE International Conference on Communications (ICC 1998)*, Atlanta, Ga., pp. 537-543, 7-11 Jun. 1998, were the first scheme ever to provide "ring speed with mesh efficiency" for span-restoration and is covered extensively in literature and in many patents. In protecting a network with p-cycles, one forms cyclic pre-connected closed paths of spare capacity while allowing working paths to take the shortest direct route over the facilities graph. p-Cycles are formed in advance of any failure and the switching actions required in real-time are completely pre-planned and essentially the same as that of a line-switched ring. Despite similarity to rings in that both use a cycle on the graph for their topology, p-cycles are unlike rings or cycle covers in that they protect both on-cycle and straddling failures, illustrated in FIGS. 1A to 1D. FIG. 1A shows an example of a preconfigured protection cycle (a "p-cycle"). In FIG. 1B, a span on the cycle fails and the surviving arc of the cycle is used for restoration. This action is functionally like a unit capacity BLSR. In FIGS. 1C and 1D, however, the same p-cycle is accessed to support restoration of working spans that are not on the cycle. In fact, FIGS. 1C and 1D are the more advantageous circumstances in general because two restoration routes are available from the p-cycle for such failures. Straddling spans make a significant difference to the failure coverage provided by the same investment in spare capacity in a ring compared to a p-cycle. Consider as an example the network in FIG. 2A of 11 nodes and 24 spans. In FIG. 2B, a cycle of 10 hops is configured as an example. If this cycle is used as a BLSR then each unit of protection capacity on the ring protects the same amount of working capacity on the 10 spans underlying the ring itself, shown in FIG. 2C. These are the so-called "on-cycle" failure spans. But if we use the same unit capacity cycle in FIG. 2B as a p-cycle we also access it for protection of spans such as (6-10) which is said to straddle the p-cycle. A straddling span has both its end nodes on the p-cycle, but is not itself part of the cycle. In the example, the p-cycle has nine such straddling span relationships, shown in FIG. 2D. Straddling span relationships have twice the leverage of an on-cycle span in terms of efficiency because when they fail, the cycle itself remains intact and can thereby offer two protection paths for each of unit of protection capacity. Note, in the case of a span such as (9-8), that the straddling spans are not limited to being only "inside" the p-cycle perimeter on the graph. FIG. 2E shows the resultant impact on efficiency, or conversely the redundancy. The example p-cycle can achieve ~36% redundancy if each of its straddling spans has two units of working capacity equipped. The corresponding ring is 100% redundant. In FIG. 2F and FIG. 2G the real-time operation is illustrated. In FIG. 2F we see a BLSR-like protection reaction to an on-cycle failure. In FIG. 2G the p-cycle is accessed to protect a straddling span failure. Note the significant increase in protection coverage provided by using the same investment in spare capacity as a ring, but simply accessing it as a p-cycle. The single p-cycle of 10 hops provides protection to 19 spans and because it protects two times its own capacity on each straddling span it actually covers 28 units of working capacity, compared to the ring which protects only 10. This simple example thus yields a protection structure of only 10/28=35.7% redundancy.

Other Significant Advances

To date the further main advances in the field of p-cycles have been:

ADM-like nodal device for p-cycle networking: Extended ADMs to implement p-cycle based span-protection without using more expensive digital cross-connects, via a "capacity slice" nodal equipment architecture with most of the desirable cost and "pay as you grow" characteristics of BLSR ring Adds. (see U.S. Pat. No. 6,404,734).

MPLS-layer link-protecting p-cycles and node encircling p-cycles: Application of p-cycles to MPLS/IP packet layer applications for link protection and concept of node-encircling p-cycles (NEPCs) to provide a means for network protection against node failure. (see U.S. Patent Application Publication No. 20040133663).

Path-segment protecting p-cycles: This work, also loosely called "flow p-cycles" was the first extension of the p-cycles concept towards a path-orientation. It significantly extends the ability of the scheme to include node-failure protection (without relying on separate NEPCs) and it also gives a significant further increase in spare capacity efficiency over regular p-cycles. The main complexity of this advance is the struggle with the "mutual capacity" issue to be explained below. As a result, in the solution that flow p-cycles offers we do not obtain failure independence of end-to-end path replacement properties. (see U.S. Patent Application Publication No. 20040109407).

Protected Working Capacity Envelope (PWCE) Concept: This most recent advance is concerned with using p-cycles under the "envelope" concept to support rapid, simplified, and automated provisioning of dynamically arriving and departing requests for protected service paths through a network. While the current advance is also amenable to the envelope concept in some attractive ways, PWCE is not itself specifically only a p-cycles related advance (see G. Shen, W. D. Grover, "Performance of protected working capacity envelopes based on p-cycles: Fast, simple, and scalable dynamic service provisioning of survivable services," *Proc. Asia-Pacific Optical and Wireless Communications Conference* (APOC) 2004, Beijing, China, 7-11 Nov. 2004, vol. 5626).

Pre-Cross-Connected-Trails (PXTs) and p-Trees (Protection Trees): PXTs and p-Trees are recent developments in the science of pre-configuring networks to failure. These produce designs that are complex from an operational and management perspective. Our new scheme will be compared to PXTs and p-Trees fairly. (see T. Y. Chow, F. Chudak, A. M. Ffrench, "Fast Optical Layer Mesh Protection Using Pre-Cross-Connected Trails," *IEEE/ACM Transactions on Networking*, Vol. 12, No. 3, June 2004, pp. 539-547).

Path Segment-Protecting P-Cycles

Background

In the work done of path segment protecting p-cycles, such as G. Shen, W. D. Grover, "Extending the p-cycle concept to path segment protection for span and node failure recovery," *IEEE Journal on Selected Areas in Communications*, vol. 21, no. 8, October 2003, pp. 1306-1319, it was explained that (paraphrasing):

" . . . It was natural, even at the time of the first work on span-protecting p-cycles, to ask if there was a path protection equivalent to basic span-protecting p-cycles. As simple as basic p-cycles are the latter question turned out to be difficult to address. Ultimately the difficulty is how to handle the aspect of "mutual capacity" contention which is intrinsic to any path oriented or multi-commodity flow type of recovery scheme in formulating the design model under a paradigm of cyclic spare capacity structures. The corresponding operational complexity in trying to coordinate which paths can access which p-cycles, for which failures, were also beyond reach at the time."

In the work on flow p-cycles, these difficulties were partly overcome by allowing the insistence specifically of end-to-end path protection to be relaxed to become protection for arbitrarily defined path segments. Accordingly the concept improves on the spare capacity efficiency of regular p-cycles but it was recognized that the operational aspects were quite complicated, failure specificity remained, and the simplicity of strict end to end switchover to a predefined backup path was not achieved.

The concept of flow p-cycles is described with the aid of FIGS. 3A and 3B. FIG. 3A is an example of a span protecting p-cycle and FIG. 3B is the same cycle viewed as a flow-protecting p-cycle. In FIG. 3A the spans (0, 2), (2, 3), (3, 5), (5, 6), (6, 8), and (8, 0) are on-cycle spans of the regular p-cycle shown. The span (0, 5) is not on the cycle, but its two end nodes are, making it a straddling span. Note, however, that spans (6-7) and (7-2), and several others are "close to" being straddling spans but cannot actually be span-protected by the cycle shown. However, an individual service path that crosses both spans (6-7) and (7-2) as in FIG. 3B can be considered to straddle the cycle shown when taking a path-level view of only the one demand that flows all the way across the p-cycle. More specifically the path segment (6-7-2) can be considered to straddle the cycle shown, between the nodes 6 and 7 as long as the total working flow remains contiguous over this segment. These basic observations lead to the concept of flow- (or segment-) protecting p-cycles. Flow p-cycle designs can access more opportunities for spare-capacity-sharing than the span p-cycle method and have an additional advantage of node failure recovery. Any flow segment that intersects a flow p-cycle can be protected, not simply spans directly on, or straddling the cycle. For example, if spans (2, 7) and (6, 7) in FIG. 3A incur failures, they cannot be restored by a span-protecting p-cycle. But, under the flow p-cycle shown in FIG. 3B, the contiguous flows that traverse spans (2, 7) and (6, 7) can be restored by the cycle. Also, flow p-cycles can recover transit traffic demands due to the loss of an intermediate node on a flow. A failure of intermediate node 7 can break the flows between node pairs (1, 10) and (4, 9). The span-protecting p-cycle in FIG. 3A cannot restore these affected transit flows; however, under the flow p-cycle shown in FIG. 3B, the flows that transit node 7 can be recovered by the cycle. Note, however that any demands being added or dropped at node 7 cannot be handled by the same flow p-cycle. The flow must be unchanged in its composition between the nodes where it intersects the flow p-cycle.

Given a cycle that is a candidate to be a flow p-cycle in a network design, the relation of any given path to the cycle can be either intersecting or non-intersecting. Only intersecting paths are relevant to the consideration of each candidate cycle. A path intersects a cycle if the two have at least two common nodes (which may include the source and destination nodes of the path). These are called intersection nodes. For example, the paths between nodes (4, 9) and (1, 10) in FIG. 3B both intersect the cycle shown and are relevant to the consideration of that cycle as a possible flow p-cycle. By inspection, that cycle would provide straddling-type protection to the two segments (6-7-2) and (0-7-6) and on-cycle protection to an example flow such as (6-5-3) should it exist. More generally, a path can intersect a cycle in a variety of more complex ways, involving more than two intersecting nodes.

The various types of intersections between flow segments and prospective p-cycles have to be determined for flow p-cycle design. FIG. 4A displays the simplest scenario, where the cycle and the relevant flow segment intersect at two nodes and the flow does not share any other spans or nodes with the cycle. FIGS. 4B through 4E show other and more general intersecting flow relationships, which can be arbitrarily complex, such as in FIG. 4E. Thus, in flow p-cycles a pre-processing program is used to identify all the protection relationships between candidate cycles and the corresponding flow segments. These are fed into the design model.

Operational Aspects of Flow P-Cycles

The main new considerations in flow p-cycles (that are not needed with span p-cycles) are the need to locate and transmit information in real time and the need for a mechanism by which the flow p-cycles are employed in a failure-specific way also in real time. In flow p-cycles it is assumed that at the time a p-cycle j is established through a node x, a list of the corresponding protected flow segments that intersect the cycle at that node is recorded in association with the p-cycle. The signal_ID of the working path of which the p-cycle protects a segment is also recorded at the node for each span failure on the flow segment. In effect this data sets up matching conditions for node x to know locally which working signals (if any) it should switch into p-cycle j, depending on which span fails on any of the flow segments passing through it. Upon failure, node x is either adjacent to the failure, in which case it sees LoS, or AIS is inserted downstream by the two nodes adjacent to the failure. All working signals bear a unique signal_ID in their overheads and, any time a node inserts AIS, it appends the ID of the incident span that has failed. Thus, the failure indication data {AIS, Signal_ID=Z, span_ID=k} passes through all nodes on the failed path. But only node x will have been "pre-wired" with the matching conditions to associate Signal_ID=Z with locally accessible p-cycle j if an indication of its failure arrives, arising from span k. Thus a logical matching rule can be applied at any node seeing an AIS indication to quickly determine if it has a custodial responsibility to do protection switching for the failed signal. FIG. 5 summarizes the principal concept. The concept requires failure detection and AIS insertion at each node. Also described in G. Shen, W. D. Grover, "Extending the p-cycle concept to path segment protection for span and node failure recovery," *IEEE Journal on Selected Areas in Communications*, vol. 21, no. 8, October 2003, pp. 1306-1319 is how the scheme may be more amenable to centralized control. A centralized control and management system maintains a database of network state and computes a suitable flow p-cycle configuration. The cross-connect commands and pre-planning information to create the desired p-cycles and to trigger failure specific p-cycle use is all downloaded based on the current set of demands being served and their protection classes. The centralized approach may suffer from the limitation of a heavy computing load and a high failure risk of the central network control manager. Thus, "flow p-cycles" are a significant extension to the basic method of p-cycles. The key idea is to define and employ p-cycles that protect segments of continuous demand flow. This frees the design from the strict requirement of protecting only spans that either form part of the cycle or lie on the cycle or directly straddle the p-cycle. But the technique protects arbitrary segments of paths determined during the capacity design phase, not end-to-end paths and it requires failure detection at each span for correct activation of the flow-protecting p-cycles in a failure-specific way. Fairly complex pre-planning information must be established and maintained at each node for each flow p-cycle going through it, so that each p-cycle knows which failed path segments it has custodial responsibility for depending on each possible span failure.

Shared Backup Path Protection (SBPP)

In a path-restorable network or a path-protected network, the reaction to a failure takes place from an end-to-end viewpoint for each service path affected by the failure. The end-to-end viewpoint means that the replacement path is determined as a completely new routing from the origin to destination node of the path. Path-oriented survivability schemes have several advantages over span-oriented techniques. SBPP is a special case of path restoration in general, where one backup path is predefined for each working path and no matter what fails on the working path, restoration is via a path assembled on demand over this one predetermined backup route. The backup route is fully disjoint from the route of the working path. In this scheme it is possible for the users to know ahead of time exactly where their service will be rerouted in a failure. This is sometimes said to be important to customers. Also, because path restoration (or protection) spreads the overall rerouting problem more widely over a network, SBPP can also usually be more capacity-efficient than span restoration designs. Node failure survivability is not as gracefully derived from span restoration techniques, but has to be obtained somewhat separately from the additional design of a set of NEPCs. Path-oriented schemes provide an inherent form of response against node failure. Another property of the SBPP scheme that can be especially useful in transparent optical networks is that fault isolation and detection is not necessary in real time to determine the restoration response. The response is the same no matter where on the working path a failure occurs. This property is called "failure independence" and it is of advantage in transparent or translucent optical networks where real-time signal monitoring may not be possible at intermediate nodes. In such networks therefore, fault isolation and detection is slow, difficult, or impossible until off-line Optical Time Domain Reflectometry (OTDR) measurements are made or such. But only the end-nodes of the path affected by a failure need to detect the failure, to activate the appropriate response and that is always just a single end-to-end switchover to the backup route. It also does not matter whether it is a node or span that failed because in both cases the end-nodes of the failed working path will simply see a loss of signal or loss of light on the specified line-cards.

On the other hand, path restoration or protection schemes are generally not as fast as their span-oriented counterpart due to the greater distances and numbers of nodes involved in signalling. SBPP in particular has to form the backup path along the preset route, after the failure, in real time. There are therefore obvious issues of scalability due to backup-sharing databases with SBPP and generally greater overall complexity is inherent with path restoration: SBPP and dynamic path restoration both involve considerations to address the "mutual capacity" issue which is the central complicating difference between span and path restoration.

It is important to note that although SBPP is a failure-independent path-oriented scheme where the protection route is completely identified in advance, spare capacity has to be cross-connected on the backup route in real-time. In this regard SBPP is somewhat mis-named: it is really best described as a pre-planned restoration scheme. In contrast FIPP p-cycles provide a true protection scheme where backup paths are completely predefined and fully pre-cross-connected prior to failure.

As so far described SBPP is like 1+1 APS where two fully disjoint paths, a working and a backup are established for each signal. For efficiency in the use of spare capacity, however, SBPP includes sharing of spare channels over the backup paths for different working path failures. The key ideas for routing under SBPP are that one tries to route the working path over the shortest or least cost path over the graph while also considering the disjoint backup routes this allows and their potential for sharing of spare capacity. Often under SBPP the working paths are called "primary" paths. Usually, but not always, there will be one or more possible backup routes between the same end nodes of the primary path. To be eligible as a backup route, a route has to have no nodes or spans in common with the route of the primary path and no spans or nodes in common with any other primary path whose backup route has any spans in common with the route being considered. Together these considerations ensure that when a primary path fails (under any single failure scenario):

a) No span or node along its backup route is simultaneously affected. This means it will be possible to assemble a backup path along that route if sufficient spare channels have been pre-planned. This can be called the self-disjointness requirement of the backup route, and is the fairly obvious condition for survivability.

b) No other primary path that is affected by the same failure has a pre-planned backup path that assumes the use of the same spare channel(s) on any span of the first primaries backup route.

This is referred to as the failure disjointness requirement and is not actually needed to enable survivability, but is required to enable the efficient sharing of spare channels over different backup routes. This more complicated set of considerations basically makes sure that if primary A and B are both pre-planned to use a certain spare channel on span X in their backup routes, then there is no (single) failure where primaries A and B would ever both need that spare channel at the same time. (If they did, then two spare channels must be provided on span X to be used simultaneously, instead of one spare channel only, which can be shared by A and B over failures that do not happen simultaneously.)

As a last consideration, the preferred choice for the backup route (assuming there are several possibilities) is the one that requires the fewest new channels of spare capacity to be placed (or committed from the available capacity). In other words one tries to chose a backup route on which a backup path can be formed for primary A which, to the greatest extent possible, assumes the use only of spare channels already associated with other primaries that have no "shared risk" in common with primary A. Backup paths may share a spare channel because their corresponding primary paths have no common-cause failure scenarios (and so would not ever have a simultaneous need to use the shared backup channel). Technically, such primary paths are said to have no Shared Risk Link Groups (SRLG) in common. As a result, one unit of spare capacity is saved on the common span relative to dedicated 1+1 APS for the same two primary paths. Depending on network details, it has been found that if at most three to five such sharing relationships or "claims" are allowed to be established by diverse primaries on each spare channel, the minimum total investment in spare capacity can be approached.

FIG. 6A through 6D illustrates the concept of spare capacity sharing on predefined backup routes in a network context. FIG. 6A shows the network 600 used in the illustration. Four mutually disjoint working routes 602, 604, 606 and 608 are shown between node pairs A-C, E-G, L-G and L-H, respectively, in FIG. 6B. FIG. 6C shows possible routes 610, 612, 614, and 616 of the protection paths for the four primaries in FIG. 6B. For example, demand A-C follows the working route 602 along A-B-C for which the corresponding protection route is 610 along A-D-O-G-C. Since these working routes are all mutually disjoint, spare capacity can be shared on their backup routes. For example 610 along A-D-O-G-C and 612 along L-E-D-O-G share the D-O-G segment and therefore as shown in FIG. 6D require only one channel of spare capacity on D-O-G per working channel on routes 602 along A-B-C and 604 along E-P-G. The grey shaded areas in FIG. 6D indicate the three spans, DO, OG, NO where sharing is possible. Of these OG achieves maximal sharing with four separate working routes sharing a single unit of spare capacity (per unit working capacity) along the backup route. Note in FIGS. 6B to 6D that it is individual spare channels that this mechanism is organized to share and it is not possible to have these channels cross-connected in advance of failure because it is not known which of the specific backup paths in FIG. 6C might be needed until failure actually occurs. Ultimately, it is because SBPP sharing is structured on a per channel basis, over groups of mutually disjoint primaries, that SBPP requires cross-connection in real time to form actual restoration paths. Each primary plus backup path pair, viewed in isolation, thus forms a 1+1 APS-like arrangement.

SUMMARY

The present patent document discloses a new and important advance in the art and theory of p-cycles that provides end-to-end path restoration with p-cycles, thus including advantages of the shared backup path protection (SBPP) scheme for survivable optical networking as well as the advantages of p-cycles. According to a further aspect of the invention, a way is presented to finally solve the mutual capacity and failure specificity problems inherent in trying to extend span p-cycles to a path oriented survivability scheme. This advance yields a scheme that retains the speed advantage of p-cycles, by virtue of the p-cycles remaining fully preconnected spare capacity structures, but which also derives the failure independence and strict end-to-end path properties of SBPP. There is thus provided a p-cycle based path protection scheme that significantly surpasses the prior SBPP scheme, most notably by not requiring to assemble or validate restoration paths in real time. Failure independent path protection with p-cycles is based on backup paths that are not only predefined as to their routes but also fully pre-cross-connected before failure. The new approach provides certain advantageous simplifications relative to the prior p-cycle art, particularly in the aspects of not having to enumerate or pre-select cycles for the design problem. The new approach provides options for some simpler design algorithms in which the p-cycles to use emerge relatively directly out of the consideration of disjoint groups of routes between end node pairs of the network graph.

According to a further aspect of the invention, there is provided a telecommunications network, comprising plural nodes connected by plural spans and arranged to form a mesh network, at least one pre-configured cycle of spare capacity being established in the mesh network, the pre-configured cycle including plural nodes of the mesh network and being pre-connected in readiness for a span or node failure in advance of the span or node failure; and the plural nodes of the pre-configured cycle being configured to protect a set of working paths that are mutually disjoint, the working paths each having end nodes on the pre-configured cycle.

According to a further aspect of the invention, there is provided a method of operating a telecommunications network, the telecommunications network comprising plural nodes connected by plural spans and arranged to form a mesh network, the method comprising the steps of: establishing at least one pre-configured cycle of spare capacity in the mesh network, the pre-configured cycle including plural nodes of the mesh network; and configuring the plural nodes of the pre-configured cycle, in advance of a failure, to protect a set of mutually disjoint working paths in case of failure of one of the mutually disjoint working paths, each of the mutually disjoint working paths having end nodes on the pre-configured cycle.

According to a further aspect of the invention, there is provided a telecommunications network, comprising protection cycles of spare capacity in the network connected in readiness for span or node failures, prior to any failure, each protection cycle providing restoration paths for a set of demands with end nodes on the protection cycle; and the set of demands protected by a single protection cycle being mutually disjoint in their working routing.

According to a further aspect of the invention, there is provided a telecommunications network, comprising protection cycles of spare capacity in the network connected in readiness for span or node failures, prior to any failure; each protection cycle providing restoration paths for a set of demands with end nodes on the protection cycle; and the set of demands protected by a single protection cycle having mutually disjoint protection paths on the protection cycle. According to a further aspect of the invention, there is provided a telecommunications network, comprising non-simple protection cycles, shown for example in FIG. 21, of spare capacity that are allowed to go over a span or a node multiple times, in the network connected in readiness for span or node failures, except for those nodes and spans the cycle crosses more than once, prior to any failure; each protection cycle providing restoration paths for a set of demands with end nodes on the protection cycle; and the set of demands protected by a single protection cycle having mutually disjoint protection paths on the protection cycle.

According to a further aspect of the invention, there is provided a method of designing FIPP p-cycles by determining groups of end-nodes amongst which all of their respective shortest paths or any route defined for the use of each node pair are collectively all mutually disjoint. According to a further aspect of the invention, designing FIPP p-cycles comprises determining groups of end-nodes amongst which all of their respective shortest paths or any route defined for the use of each node pair have mutually disjoint protection routes on the same cycle.

According to a further aspect of the invention, designing FIPP p-cycles comprises iteratively placing the highest-merit candidate cycle as a FIPP p-cycle based on optimally or approximated solving a sub-problem for determining the best set of mutually disjoint routes between end nodes to be protected by the cycle.

According to further aspects of the invention, designing FIPP p-cycles is done without enumerating any candidate set of cycles, and may be done while jointly routing working capacity, and the routes chosen to route traffic between each end-node pair may be chosen or adjusted in conjunction with the choice of the FIPP p-cycles.

Further aspects of the invention will be apparent from the claims and description of the preferred embodiments, which are incorporated here by reference.

DESCRIPTION OF THE DRAWINGS

There will now be given a description of the drawings, by way of illustration only and not with the intent of limiting the invention, where like reference characters denote like elements, and where:

FIG. 10A-11C are examples of various ways a path can fail in a FIPP p-cycle network;

FIG. 11 is an example test network;

FIG. 14A-17B are various potential FIPP p-cycles for the network of FIG. 11 and their logical view;

DETAILED DESCRIPTION

Figure 1B:
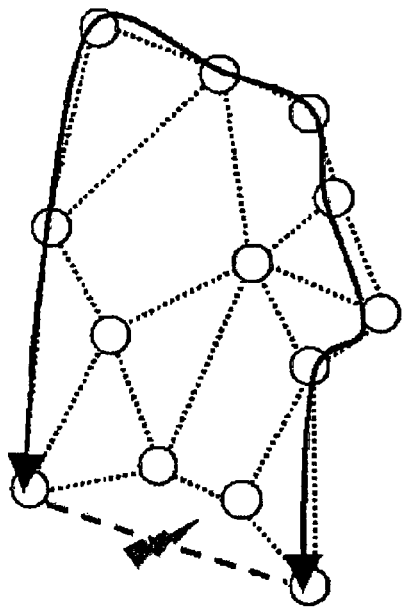
FIG. 1A-1D shows a p-cycle protecting a network (prior art)
Figure 1D:
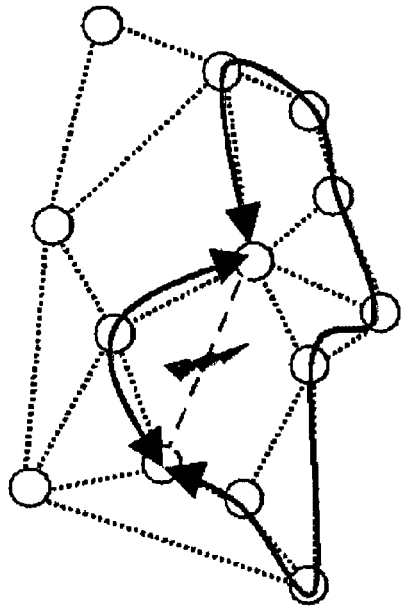
Figure 1A:
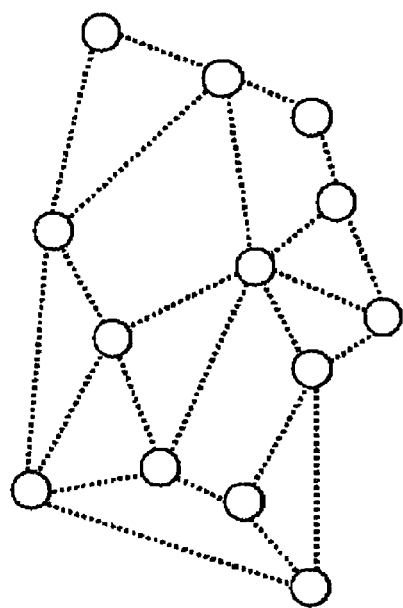
Figure 1C:
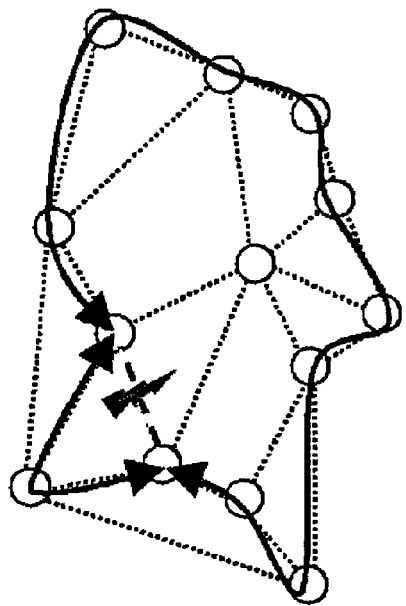
Figure 2A:
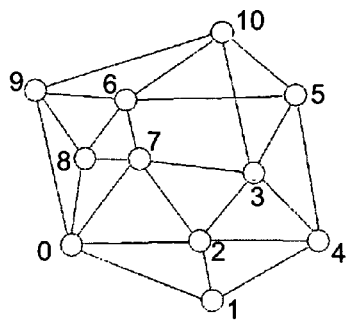
FIG. 2A is a network to be protected (prior art)
Figure 2B:
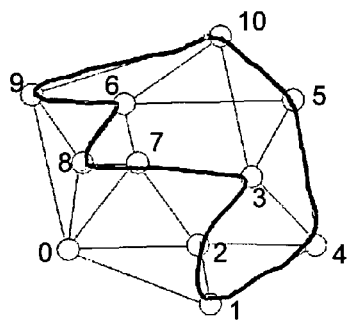
FIG. 2B shows a p-cycle protecting the network of FIG. 2A (prior art)
Figure 2C:
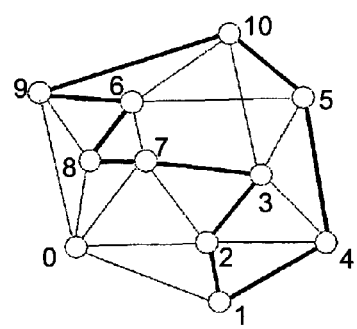
FIG. 2C shows the on-cycle spans of the p-cycle shown in FIG. 2B (prior art)
Figure 2D:
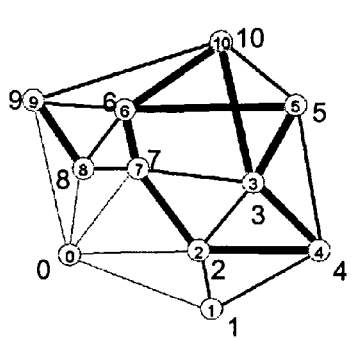
FIG. 2D shows the straddling spans of the p-cycle shown in FIG. 2B (prior art)
Figure 2E:
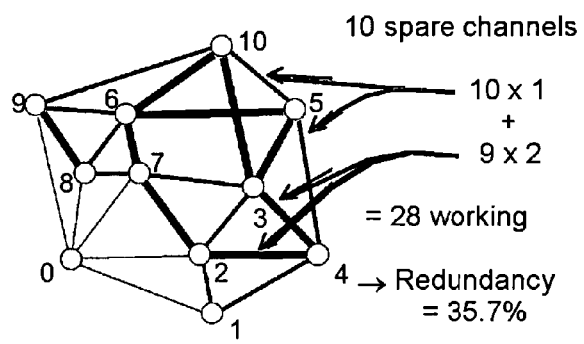
FIG. 2E shows the redundancy of the p-cycle shown in FIG. 2B (prior art)
Figure 2F:
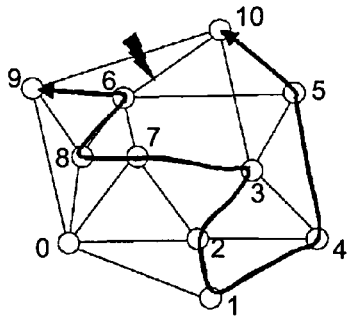
FIG. 2F shows the p-cycle responding to the failure of an on-cycle span (prior art)
Figure 2G:
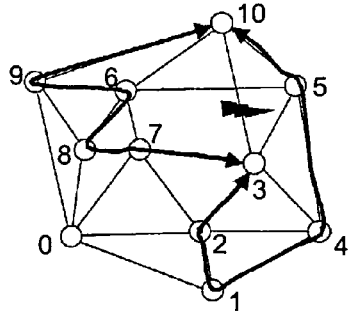
FIG. 2G shows the p-cycle responding to the failure of a straddling span (prior art)
Figure 3A:
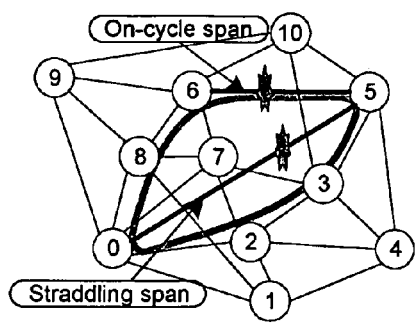
FIG. 3A is an example of a span protecting p-cycle (prior art)
Figure 3B:
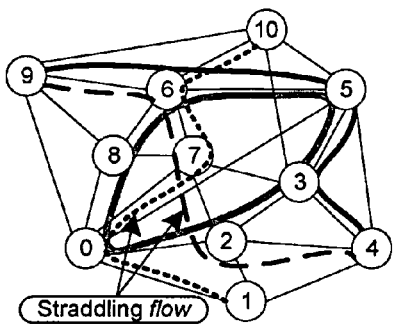
FIG. 3B is an example of the p-cycle of FIG. 3A viewed as a flow-protecting p-cycle (prior art)
Figure 4A:
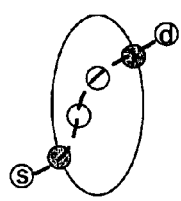
FIG. 4A-4E show various flow-to-cycle relationships in a p-cycle (prior art)
Figure 4B:
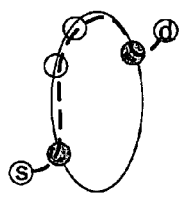
Figure 4C:
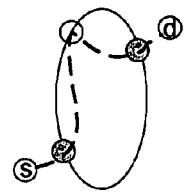
Figure 4D:
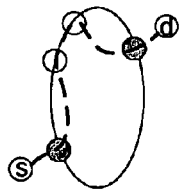
Figure 4E:
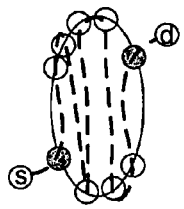
Figure 5:
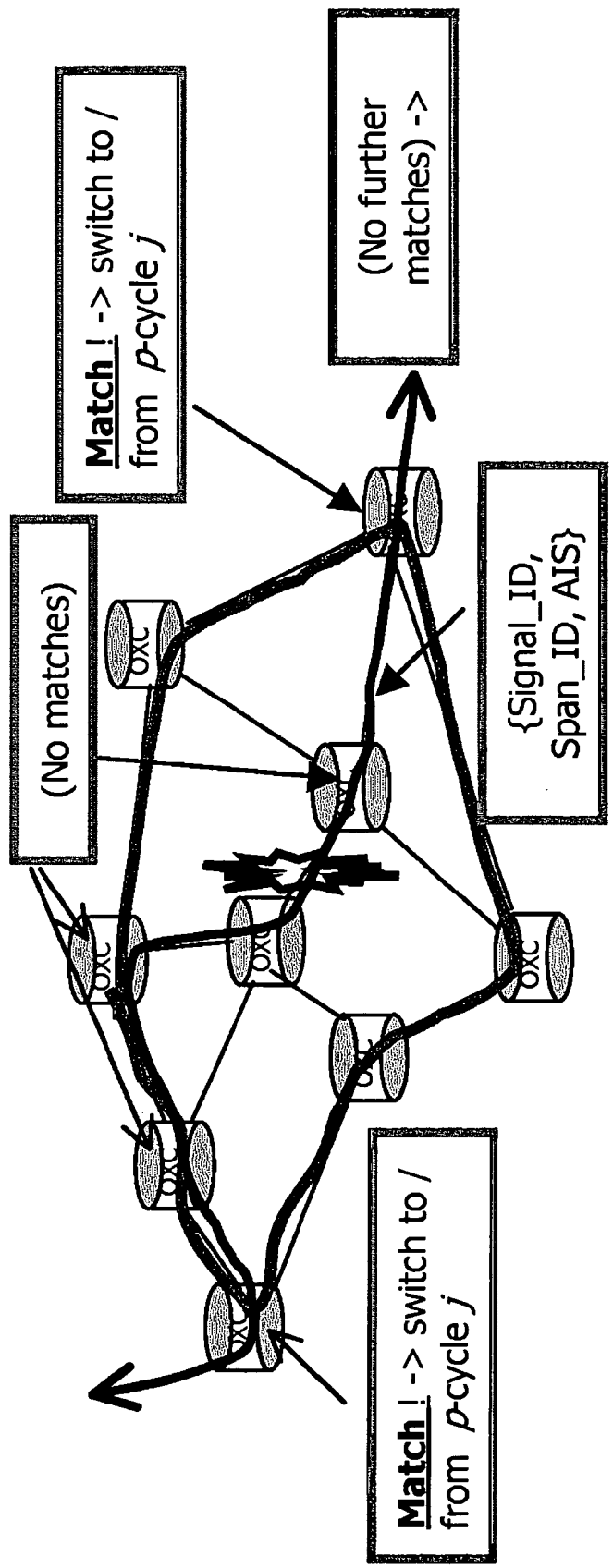
FIG. 5 depicts a network that is pre-planned to activate flow-protecting p-cycle in the event of a failure (prior art)

In the claims, the word "comprising" is used in its inclusive sense and does not exclude other elements being present. The indefinite article "a" before a claim feature does not exclude more than one of the feature being present. A pre-configured cycle, and any node on the cycle, is configured to protect a set of working paths having end nodes on the pre-configured cycle when it is configured, upon detection of a failure in the working path, to route signals destined for the working path along the pre-configured cycle to reach the end node at the other end of the working path on which there has been a span or node failure. In practice, this means that each node will typically contain hardware that detects a loss of signal, identifies the working path on which the loss of signal occurred, and re-routes signals onto the pre-configured cycle. If the signal is in the form of packets, then each packet will contain an identification of the nodes in the pre-configured cycle and the destination node. The hardware and software required to form this function is well known, and need not be described in greater detail.

The Mutual Capacity Problem which Underlies all Path-Oriented Schemes

In this section we explain the mutual capacity problem that underlies all attempts at path-oriented survivability and which must be addressed in one form of other (or avoided) by any kind of survivability scheme. The way in which the proposed art addresses this ordinarily difficult aspect of any path-oriented survivability scheme is one of its inventive and insightful aspects.

In span restoration, the routing problem is to find a replacement path set in which all paths have the same end nodes, i.e., to find k paths between two nodes where k is the lesser of the number of working paths on the failed span, or to find the maximum number of feasible replacement paths. In either case it is a single commodity flow problem for which the mutual capacity complication does not exist and solutions of low polynomial order complexity exist (i.e., k-shortest paths or max-flow). By comparison, any path-oriented approach inherently presents a type of multi-commodity simultaneous flow problem. It involves identification of the different origin-destination nodes of each path that are disrupted by the failure scenario and production of multiple subsets of restoration paths within a single pool of spare capacity. The central issue that makes this a much more complex rerouting problem is called "mutual capacity." The theoretical considerations in this section reveal why the flow p-cycles advance remained with a necessary aspect of failure dependence, for it to work. Secondly, this theoretical development or viewpoint leads to the question: "Well SBPP is path oriented, but also failure independent. How does that actually work?" It is by asking this question in light of the theory of mutual capacity that we come to realize that SBPP achieves this through its particular set of pre-failure considerations on the sharing of spare capacity over backup paths that are associated with mutually disjoint primary paths. Although it becomes considerably simpler in FIPP p-Cycles, this insight provides the final aspect needed to achieve failure independence and strict end-to-end path protection with p-Cycles.

To illustrate, consider a number of simultaneously affected O-D pairs and imagine for argument's sake that they each took a turn in sequence to obtain restoration paths. One O-D pair may have 20 equivalently good route choices that will restore it, but for another O-D pair there may be only one particular route on which it can obtain restoration paths. What if the first O-D pair chooses a route that uses up the spare capacity on the only possible route for the second O-D pair? More generally, how can the exact route choices made by each of a multitude of O-D pairs be coordinated so that the spare capacity that is crucial for restoration of one O-D pair is not blindly used up by another, which may have had different routing options in any case. This is called the mutual capacity problem in reference to the central quandary of this situation: to which pairs should we allocate the spare capacity of a span among the many that try to seize it?

FIG. 7A through 7D shows how easily the path-set choice for one O-D pair can interfere with the feasible paths for other O-D pairs in a way that may be detrimental both to the total restoration level and may create severe differences between the restoration levels achieved for different individual O-D pairs. Network 700 is made up of nodes 0 through 9. The overall complexity in a real network will be vastly greater than in FIG. 7A through 7D, but even in that simple example we can see that if O-D pair (2-5) happens to grab the three paths 702, 704, and 706 shown in FIG. 7A first, then O-D pair (1-8) is limited to at most one path 708. But if pair (1-8) first seizes the two paths 720 and 722 in FIG. 7D, the tables are turned and O-D pair (2-5) is completely shut out and remains disconnected as part of the overall restoration response. Many other combinations are possible with varying total and individual O-D pair recovery levels depending on the topology, the exact random order assumed, and the exact capacity distribution. For example, in FIG. 7B, if O-D pair (2-5) grabs paths 710 and 712, then O-D pair (1-8) is left with 714, and in FIG. 7C, if O-D pair (1-8) grabs path 718, then O-D pair (2-5) is left with path 716. The example also illustrates the concern with relying on a totally ad hoc approach to path restoration such as "GMPLS auto reprovisioning", (as described in G. Kaigala, W. D. Grover, "On the Efficacy of GMPLS Auto-Reprovisioning as a Mesh-Network Restoration Mechanism," *Proceedings of IEEE Globecom* 2003, San Francisco, Dec. 1-5, 2003, paper GC-13-6) in which every affected end-node pair will simply conduct its own independent shortest-path reprovisioning attempt.

More formally, let us pinpoint the issue mathematically by looking at the problem of minimum-cost multi-commodity flow, which is essentially the problem of spare capacity design for generalized path restoration. By laying down the general model that underlies all path oriented restoration schemes, we can pinpoint the mutual capacity complication and then systematically explain how already known schemes directly or indirectly addresses the complication. Let us define:

S set of spans in the network
$s_j$ spare capacity on span j.
$w_j$ working capacity on span j.
$c_m^{\,j}$ cost of equipping a channel on span j in a system of the $m^{th}$ modular capacity
$\zeta_j^{r,q}$ is a 1/0 indicator parameter that relates the eligible working routes to the graph topology (which itself never appears directly). The indicator is 1 if the $q^{th}$ working route for demand pair r uses span j.
$P_z^{\,r}$ set of eligible restoration routes available to O-D pair r for its restoration under failure scenario z.
$\delta_{z,j}^{\,r,p}$ a 1/0 parameter that is 1 if span j is in the $p^{th}$ eligible route for restoration of O_D pair r in the event of failure scenario z.
$f_z^{\,r,p}$ an assignment of restoration flow to the $p^{th}$ route available for restoration of O-D pair r for failure scenario z.

The rerouting problem takes place in the context of one specific failure scenario at a time. However, the later capacity design problem has to simultaneously address all failure scenarios. A common set of failure scenarios to consider is all single-span failures.

In a path-restorable network (i.e., with a failure-specific response) it is possible to release the surviving upstream and downstream portions of a failed working path and make the freed capacity available to the restoration process. This option is called stub release. Stub release is the main sense in which path restoration provides a failure-specific response. For each failure scenario there is a different environment of stub-release capacity to be exploited. The question of stub release does not arise with span restoration because the reconfiguration that occurs in the latter is around the failed span itself. In other words, the stub capacity leading up to and away from the break (in each direction) is inherently always reused as part of the end-to-end solution. While stub release makes restoration more capacity efficient, there are concerns that stub release causes operational complications.

Let us now look at the simplest basic form of path restoration capacity design model. This model corresponds to a path-restorable network with unit capacity provisioning in which working paths are assigned by shortest path routing (or some other independent routing process) before the optimization, which is for spare capacity only. As written, it also considers only single-span failure scenarios and restoration without stub release.

$$\min \sum_{\forall j \in S} c_j \cdot s_j \qquad 1$$

path-SCA:
Subject to:
1) The total demand lost by relation r equals the total restoration flow.

$$\sum_{\forall q \in Q^r} \zeta_i^{r,q} \cdot g^{r,q} \leq \sum_{\forall p \in P_i^r} f_i^{r,p} \qquad 2$$

2) Spare capacity is sufficient to support restoration flows:

$$\sum_{\forall r \in D} \sum_{\forall p \in P_i^r} f_i^{r,p} \cdot \delta_{i,j}^{r,p} \leq s_j \qquad 3$$

3) The restoration flows $f_i^{r,p}$ and spare capacity $s_j$ are integer.

In this model the working flows, $w_j$, are provided as input parameters and it is a set of multi-commodity restoration flow assignments that is being solved so as to minimize the total spare capacity for restorability against all single-span failures. As such this model is the path restoration counterpart to SCA for span restoration. The two constraint systems express "restorability" and "spare capacity adequacy" in the same logical interrelationship between these considerations in SCA except that here the restoration flows are multi-commodity in nature, on the end-node pairs represented by r, rather being between the custodial nodes of the span failure.

The mutual-capacity problem or "complication" appears in the second constraint system. It says that in the presence of any specific failure i, we must decide precisely which and how much restoration flow is to be allowed, for each affected end-node pair, on each possible restoration route that crosses span j. The total spare capacity of every span j has thus to be very carefully allocated amongst the multiple restoration flows under each failure scenario that may want to cross span j.

Key Concepts of Failure-Independent Path-Protecting P-Cycles

There is now described a principle through which ordinary span-protecting p-cycles can be extended to provide an end-to-end path protection technique without floundering on the complexity of the mutual capacity and failure specificity issues as in flow-p-cycles. This key principle is simply stated as this: Let the cycles act as p-cycles for end-to-end paths between nodes on the cycle, but only allow each cycle to provide protection relationships to a group of paths whose routes are all mutually disjoint.

Figure 6A:
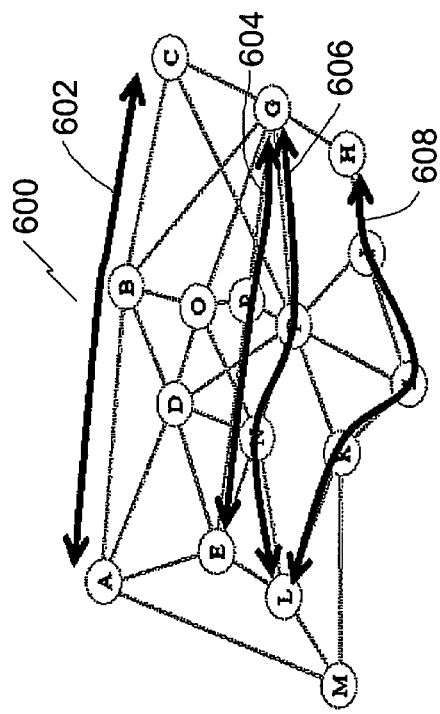
FIG. 6A-6D are examples of four disjoint primary paths sharing spare capacity on their backup paths.
Figure 6B:
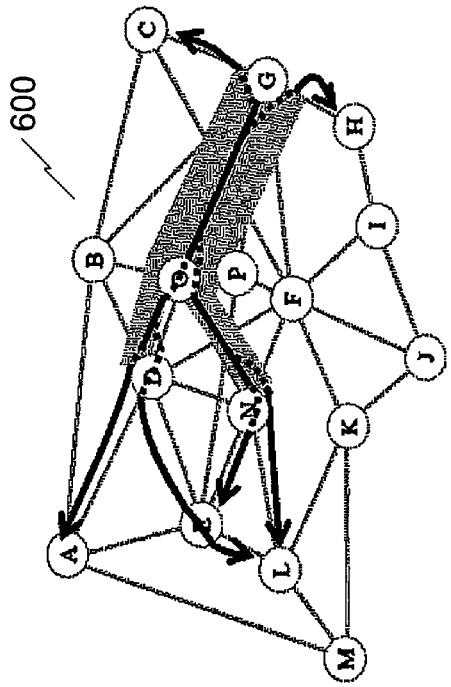
Figure 6C:
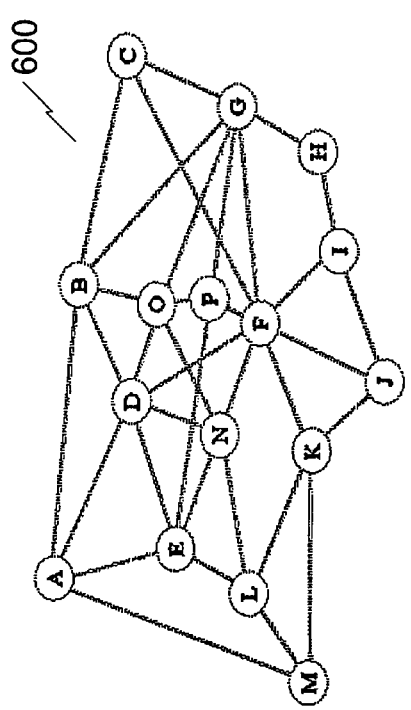
Figure 6D:
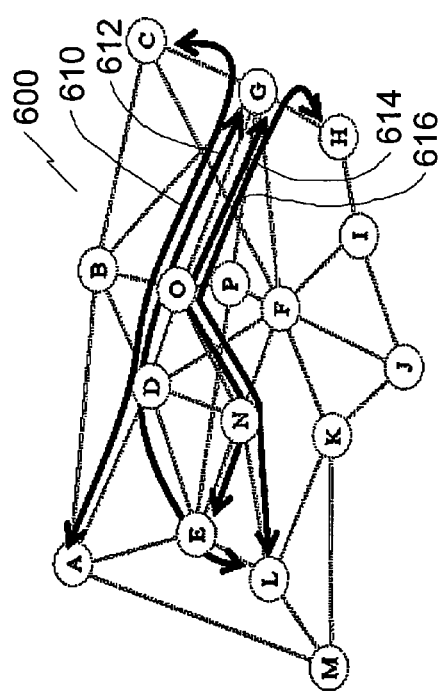
Figure 7A:
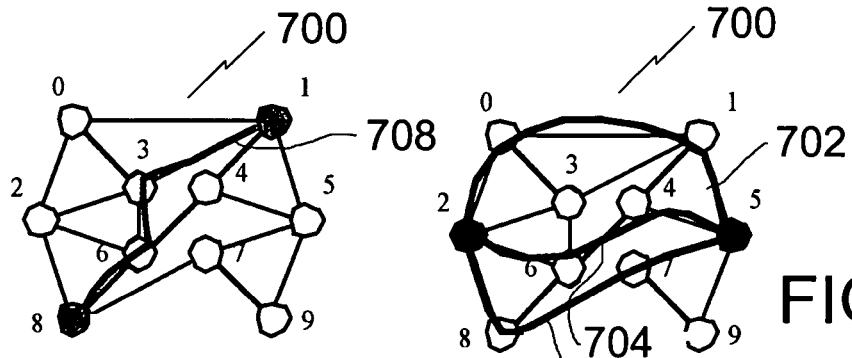
FIG. 7A-7D are examples of how mutual capacity affects path restoration between two paths in a network; (prior art)
Figure 7B:
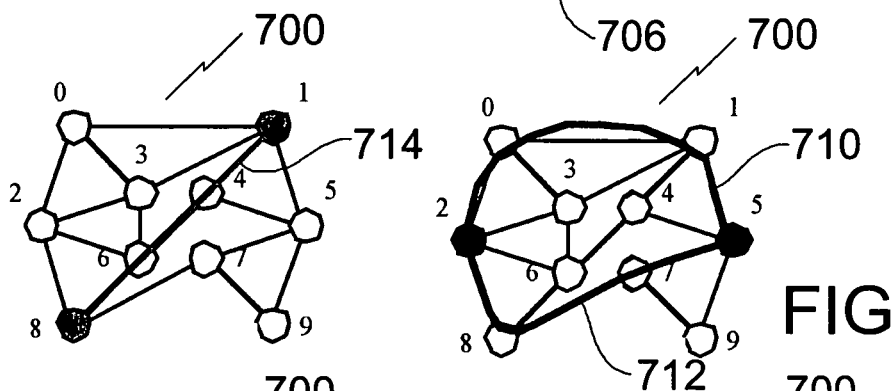
Figure 7C:
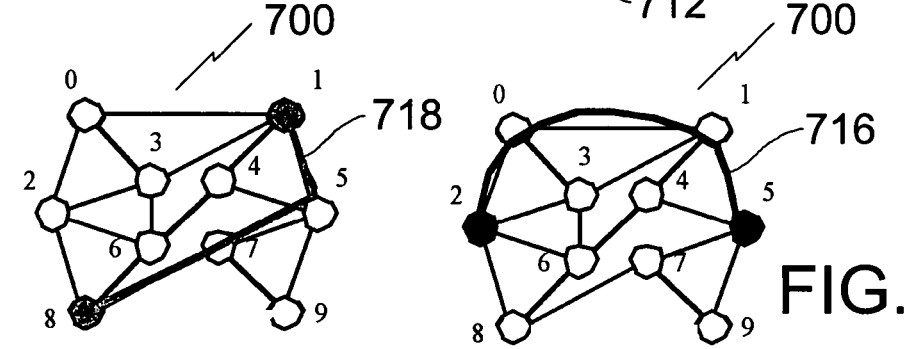
Figure 7D:
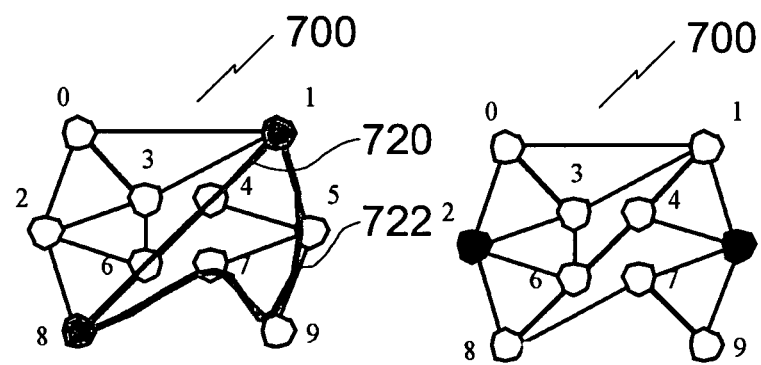
Figure 8A:
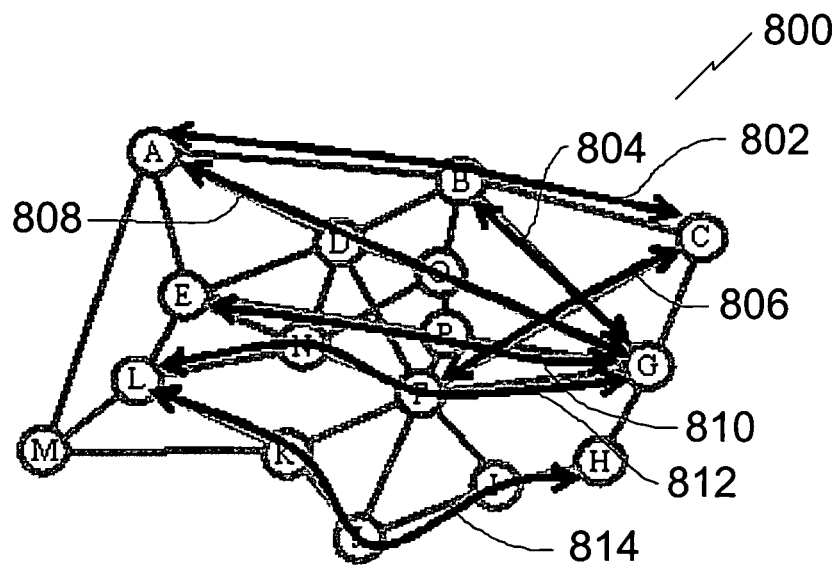
FIG. 8A shows a set of working routes in a network that can be protected by a FIPP p-cycle in FIG. 8B; used for comparing FIPP and SBPP.
Figure 8B:
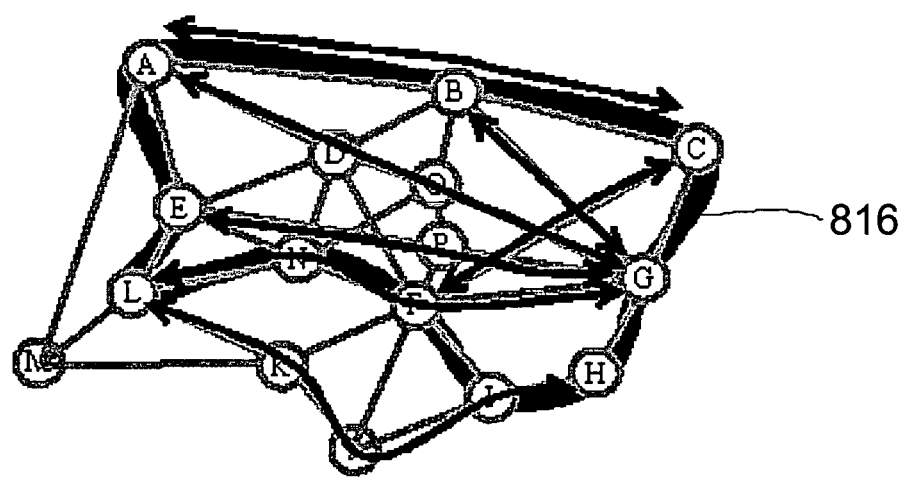

To illustrate this principle, let us return to the backdrop of FIG. 6A and show how an augmented set of working routes can be arranged to share a single FIPP p-cycle for their end-to-end protection, without any dependency on failure location. FIG. 6B through 6D shows how a certain set of four primary paths which are disjoint from each other can share spare channels on several spans to help form any of their backup paths. FIG. 8A shows an augmented set of end-node pairs (seven in total for the example) and routes between them, which include the same subset of four working paths from FIG. 6B, all of which can share the same FIPP p-cycle 816 on their end-nodes as shown in FIG. 8B.

Because of the properties of p-cycles, inherited by FIPP p-cycles, strict mutual disjointness among protected working paths 802, 804, 806, 808, 810, 812, and 814 in network 800 with nodes A through P as illustrated in FIG. 8A is not the only suitable condition. Each straddling working path could actually have up to two protection routes, because for such failures both sides of the p-cycle survive. If only one of the protection paths is actually used, then there may be an opportunity to consider protection (by the same FIPP p-cycle) of working paths that are not disjoint. The complete FIPP p-cycle principle can be stated as: Let the FIPP p-cycles act as conventional p-cycles for end-to-end paths between nodes on the cycle, but only allow each cycle to provide protection relationships to a group of origin-destination node pairs whose working routes: a) as a set, are all mutually disjoint or b) have disjoint backup routes on the cycle being considered.

Figure 9:
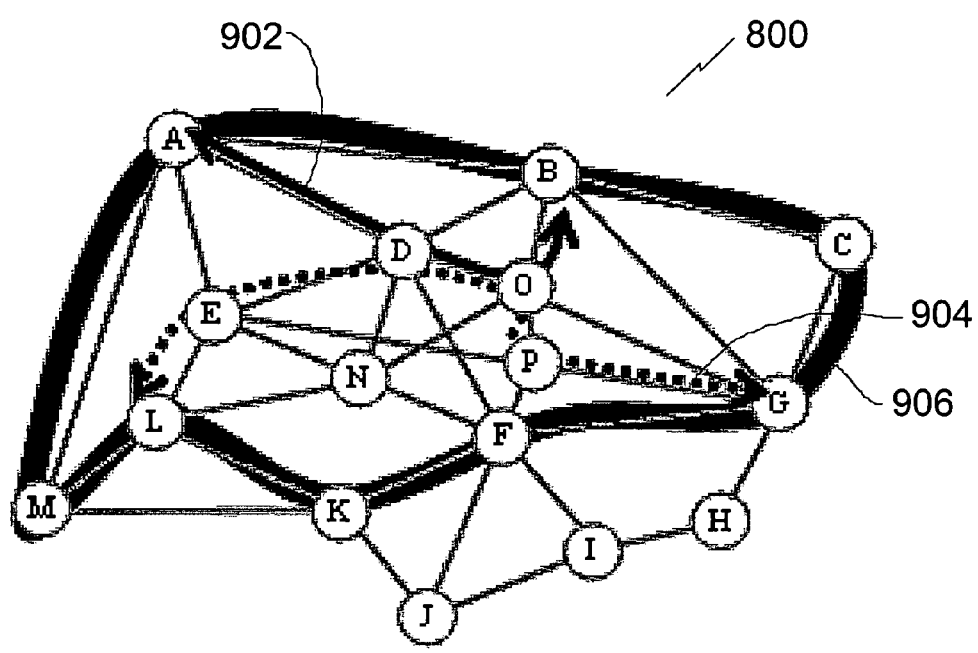
FIG. 9 is a FIPP p-cycle protecting non-disjoint, straddling working paths.

This principle is illustrated in FIG. 9. In FIG. 9 we see two sample working routes A-B routed along A-D-O-B shown by the thick arrow tipped line labelled 902, and L-G, routed along L-E-D-O-P-G as shown by the dashed line labelled 904. They are both routed over span D-O. However, if there is only one unit of capacity protected on each working route, and the end-nodes are pre-programmed to use the backup paths along the routes L-K-F-G for working path L-G and A-B for working path A-B, then there is no contention for spare capacity.

However, it is easier to illustrate the concept as pertaining to fully mutually disjoint routes (and hence use only the first principle) in the protected group of paths under any one FIPP p-cycle. As long as each protected route that fully straddles the cycle 906 is loaded with twice the capacity of the corresponding cycle itself, this distinction is not expected to carry much of a capacity penalty. This is a reasonable assumption in joint optimal designs, because the solver will be strongly biased towards producing relationships where straddlers are can fully utilize both sides of the FIPP p-cycle. For the rest of this discussion we do not consider this second principle.

Thus, the important property that allows multiple working paths to be protected by one p-cycle in common is that they are all mutually disjoint. Otherwise, we could not simply lay down the p-cycle shown and say that it can protect the specified working paths, because then the ability of the cycle to protect them would actually depend on what span failure occurred. In some cases the cycle may be adequate, but in others it could not adequately provide the intended protection. We can see in FIG. 8 that this is an extremely simple qualification on the sets of end-to-end paths that a p-cycle is allowed to protect. But its effect is just exactly what leads to failure-independent end-to-end path protection via fully pre-connected structures of spare capacity. In a sense this draws directly from the key property underlying SBPP: that in order to share spare channels on a span, all participating primaries must be mutually disjoint. Only what is different, and significant, is that by defining a p-cycle with respect to a group of mutually disjoint primaries, those primary paths are all enabled to share a fully pre-connected protection structure, not simply individual spare channels.

The difference means that all of the following properties arise in conjunction:
  a) No cross-connections will be needed in real time to form protection paths. This means the utmost in speed is possible as well as the certainty that the optical path works when needed. As with any pre-connected protection structure, only two nodes (here the path end nodes) need to act in real-time, to switch the affected traffic into and out of the backup path.

b) Protection switching is entirely failure independent, end-node controlled, and only a single advance switching action is pre-programmed at each end node of the path.

c) Routes between end nodes within the group of routes that a p-cycle protects, which straddle the cycle, can each bear two working paths for each unit of spare capacity from which the p-cycle is formed.

d) Protection of paths that transit a failed node is obtained if the group of working routes is required to be fully link and node disjoint. Otherwise node disjointness can also be relaxed to link disjointness. These properties are identical to SBPP. For SBPP to provide node protection (as well as link) all primaries that share spare capacity on their backup routes must be fully disjoint, but otherwise can be only link disjoint.

e) The route taken by any signal in a failure-protected state can be fully known in advance. By the same token, it should be no harder than in regular p-cycle design to simply limit cycle size to limit the length of any restoration path, or even specifically limit the length of any individual protection path.

f) The protection structures in the network are a small number of cycles, easily visualized, changeable, and manageable as a set of conventional p-cycles for span-oriented protection.

g) It is immediately apparent that dynamic demand can be just as easily handled under the PWCE concept using path-protecting p-cycle structures as it is with conventional p-cycles.

Figures 10A, 10B:
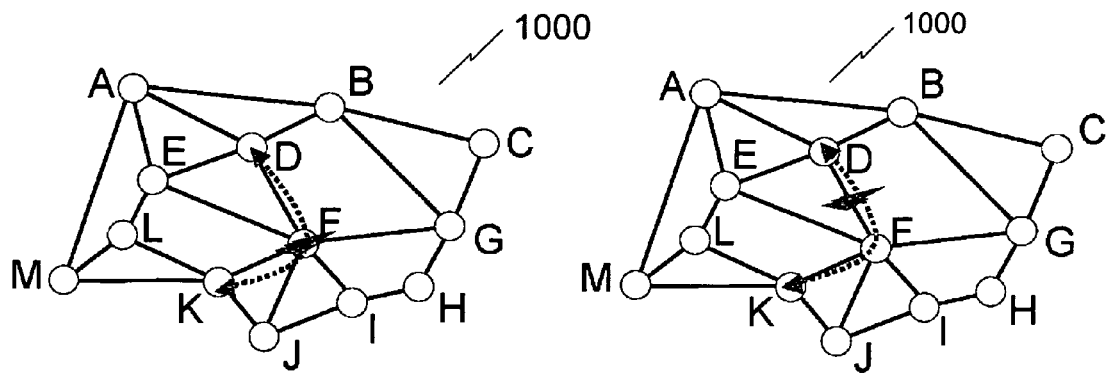
Figure 10C:
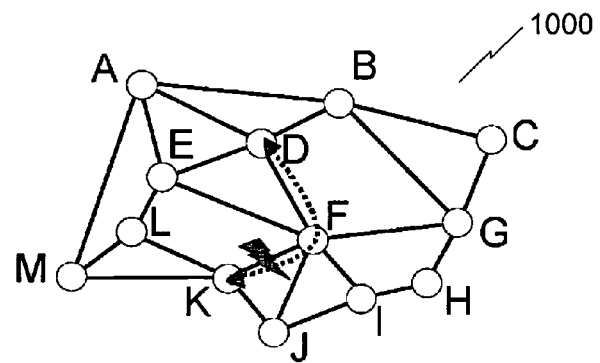
Figures 10D, 10E:
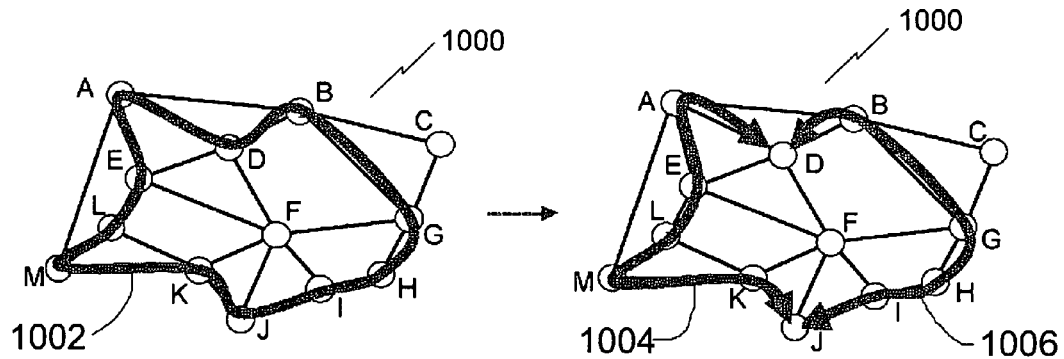
FIG. 10D shows a FIPP p-cycle protecting the path shown in FIG. 10A-10C.
FIG. 10E shows the FIPP p-cycle of FIG. 9D restoring the path shown in FIG. 10A-10C.

Operation is almost unchanged relative to ordinary p-cycles. To illustrate, consider the FIPP p-cycle 1002 in the network 1000 with nodes A through M in FIG. 10D. The demand J-D routed J-F-D is protected as a straddling demand by the FIPP p-cycle 1002. FIG. 10A shows a possible failure of node F, affecting an end-to-end lightpath between J-D. FIGS. 10B and 10C show the possible failures of spans J-F and F-D along the working route of the demand J-D that could also affect the lightpath. We can see that the FIPP p-cycle 1002 provides two protection options 1004 and 1006 as shown in FIG. 10D, with only the end-nodes J and D having to do any kind of switching. This also shows the failure independence property we have been discussing in the previous sections. The simple pre-armed end-node limited switching action does not depend on the exact failure or even the type of failure (i.e. span or node failure). We can see that by considering protection of compatible demands by a single p-cycle, we avoid the need for any failure information dissemination as no failure can possibly strike two demands protected by the same FIPP p-cycle. We also address the mutual capacity problem because no two members of a compatible demand set can fail simultaneously, there cannot be any contention for spare capacity on a p-cycle.

FIPP P-Cycle Network Design

Let us now ask how we would correspondingly design networks that operate based on this type of protection structures. To do so let us first define the concept of a group of "disjoint routes" to represent any set of working routes that are all mutually disjoint. The mutual disjointness applies to spans if the design aim is to protect only against span failures, otherwise the disjointness applies to both nodes and spans of the routes in the group. Any set of primary paths in SBPP that share at least one spare channel amongst their backup routes could be said to form such a group of disjoint routes. The significance is that any protection resource shared by paths routed over the members of a disjoint group of routes will never be in conflict with each other under any single failure scenario. In this framework, we can restate SBPP as a scheme for defining disjoint route sets for the sharing of individual spare channels and FIPP p-cycles becomes a scheme for defining disjoint route sets for the sharing of entire pre-connected protection structures. Given this orientation to viewing demands in groups based on their routing leads to the following basic ideas through which to approach the FIPP p-cycles network design problem.

One principle can be stated as: "Identify groups of routes over the graph which are all mutually disjoint. Then define a path-protecting p-cycle by routing a cycle through the collected set of end-nodes of these routes. Allow that p-cycle to be capacitated so as to protect all the working paths that the network's demand matrix requires to be routed over those routes."

A second principle with the same aim is to say: "Given a cycle considered as a candidate FIPP p-cycle, identify a subset of routes between end-nodes that are on the same cycle which never contend at the same time for restoration by the associated p-cycle (i.e., which form a disjoint route set on the end-nodes of the candidate p-cycle)."

We now describe design methods incorporating both principles.

FIPP-Cycle Network Optimal Spare Capacity Placement Design

Let us first define the term "Disjoint Route Set" (DRS) to represent any group of demands (routed along the shortest paths so the word demand and working route are used interchangeably in this subsection) that share no commonality in their working routing. Any set of primary paths in SBPP that share at least one spare channel amongst their backup routes are thus for example a DRS by definition. By definition a single failure (span or node failure) can affect the demands on at most one route of a DRS. Given this orientation to viewing working routes in DRS groups leads to the following basic Integer Linear Programming (ILP) based design model to understand the theoretical performance of FIPP p-cycles relative to equally optimal SBPP and regular p-cycle network designs. We first use standard methods to enumerate all the cycles of the graph. Eligible cycles are denoted p and (x,y) denotes the end nodes of any demand flow. We now define the following model:

Sets

S Set of spans, indexed by i (failed) or j (surviving).

D Set of demand relations, indexed by r.

P Set of eligible cycles, indexed by p.

Parameters $\Delta$ A large positive constant (100000).

$\nabla$ A small positive constant (0.0001).

$c_j$ Cost of span j. (Can include all equipment costs and is proportional to length)

$d_r$ Number of demand units for relation r.

$x_r^p$ Equal to 1 if the demand relation r is on-cycle p, 2 if the demand relation r is completely straddling cycle p; 0 otherwise.

$\pi_j^p$ Equal to 1 if cycle p crosses span j, 0 otherwise.

$\partial_{m,n}$ Equal to 1 if demand relations m and n are rivals. This means m and n are not disjointly routed.

Variables $s_j$ Spare capacity placed on span j.

$n^p$ Number of unit-capacity copies of cycle p in the solution.

$n_r^p$ Number of copies of cycle p used to protect demands on relation r.

$\gamma_r^p$ Equal to 1 if cycle p does protect demand relation r, 0 otherwise.

FIPP-SCP:

$$\text{Minimize} \sum_{\forall j \in S} c_j \cdot s_j \quad (4)$$

(Minimize total cost of spare capacity placed.)
Constraints $$\sum_{\forall p \in P} x_r^p \cdot n_r^p \geq d_r \ \forall r \in D \quad (5)$$

(The entire demand quantity for relation r must be protected)

$$n^p \geq n_r^p \forall r \epsilon D \quad (6)$$

(Place the maximum number of copies of cycle p required for any single demand.)

$$s_j \geq \sum_{\forall p \in P} n^p \cdot \pi_j^p \ \forall j \in S \quad (7)$$

(Place enough spare capacity to form all the p-cycles.)

$$\gamma_r^p \geq \nabla \cdot n_r^p \forall r \epsilon D, \forall p \forall P \quad (8)$$

($\gamma_r^p$ is 1 if $\cdot n_r^p$ is greater than 0)

$$\gamma_r^p \leq \Delta \cdot n_r^p \forall r \epsilon D, \forall p \epsilon P \quad (9)$$

($\gamma_r^p$ is 0 if $n_r^p$ is 0.)

$$\partial_{m,n} + \gamma_m^p + \gamma_n^p \leq 2 \forall (m,n) \epsilon D^2 | m \neq n; \forall p \epsilon P \quad (10)$$

(Don't allocate the same cycle to protect two rival demands.)

Constraint (5) ensures that all demand for a particular O-D pair r is protected using p-cycles. Constraint (6) ensures that only the max number of instances of p-cycle p required for any single demand relation r is provisioned. Constraint (7) ensures that sufficient spare capacity exists to form all the p-cycles selected by the design. Constraints (8) and (9) define the binary variable $\gamma_r^p$ which simply defines, at run-time, whether p-cycle p is indeed used to protect demand r. Constraint (10) is the key new FIPP specification that ensures that any individual p-cycle only protects a set of mutually disjoint working routes. If working routes for demands m and n are not disjoint (i.e [.,?]$\partial_{m,n}$=1) then only one or none of $\gamma_m^p$ or $\gamma_n^p$ can be 1 at the same time- and consequently p-cycle p can only be used to protect one of m or n.

The above model is a mixed ILP model. One relaxation which we use is to drop the integrality requirement on the $n_r^p$ variable. $n_r^p$ is the number of unit working flows that the cycle p protects for demand pair r. In cases of a straddling node pair with an odd number of demand units, there may result an under-utilized p-cycle even as part of an optimal design. In this case the relaxed model would show fractional values for $n_r^p$ but real fractional values would never arise in these circumstances because the working flows are themselves integral. In addition, since $n^p$, is kept as an integer it doesn't matter to the solution quality if $n_r^p$ is fractional. This is just another instance of flow variable relaxation under integer capacity that is a useful and well-recognized technique in network design, which does not affect the ultimate solution quality (but reducing the number of integer variables speeds up the solution).

Disjoint Route Set Approach to FIPP P-Cycle Network Design

In contrast to the approach presented above, we now use the second principle and form DRS' as candidates and select corresponding FIPP p-cycles that unify their end-nodes. But as before, we consider using the shortest working route for each demand relation in the network, identifying groups of mutually disjoint routes and forming candidate DRSs from them. Enumerating all possible DRSs as design candidates would be ideal, but a subset would be suitable in practice. We then ensure that each working route belongs to at least one candidate DRS, but preferably many. Finally, we build efficient FIPP p-cycles by routing a cycle through the collected set of end-nodes of the member demands of a DRS and capacitate all cycles so as to protect all the working paths that the network's demand matrix requires.

We now propose an ILP design model based on this "DRS enumeration" approach to the problem. This model, when solved with the set of all possible DRSs as input to the solver, should strictly produce an identical cost design as the FIPP-SCP design presented earlier.

The ILP model uses the following additional notation:
Sets
S is the set of all spans in the network, and is indexed by i for a failed span, and j for a surviving span.
C is the set of all eligible DRSs, and is indexed by c.
D is the set of demand relations, indexed by r.
$C_r \epsilon C$ is the set of all DRSs that contain the working route of demand relation r, and is indexed by c.
P is the set of eligible cycles, indexed by p.
$P_c \epsilon P$ is the set of eligible cycles that can protect DRS c, and is indexed by p.
Parameters
$c_j$ is the cost of span j.
$d_r$ is the number of unit demands in the bundle of demand relation r.
$x_r^p \epsilon \{0,1,2\}$ encodes the relationship between a demand's working route and eligible p-cycles. $x_r^p$=1 if demand r's end-nodes are on cycle p and its working route passes over at least one span on cycle p, $x_r^p$=2 if demand r's end-nodes are on cycle p and its working route straddles cycle p; and $x_r^p$=0 otherwise.
$\pi_j^p \epsilon \{0,1\}$ encodes a cycle's constituent spans. $\pi_j^p$=1 if cycle p crosses span j, and $\pi_j^p$=0 otherwise.
Decision Variables
$s_j \geq 0$ is the spare capacity placed on span j.
$n_c^p \geq 0$ is the number of unit-capacity copies of cycle p used as a FIPP p-cycle to protect DRS c.
$n^p \geq 0$ is the total number of unit-capacity copies of cycle p used as a FIPP p-cycle for all DRSs.

The ILP formulation of the DRS-based FIPP p-cycle network design model (FIPP-DRS) is as follows:
FIPP-SCP-DRS:

$$\text{Minimize} \sum_{\forall j \in S} c_j \cdot s_j \quad (11)$$

Subject to $$\sum_{\forall c \in C_r} \sum_{\forall p \in P_c} x_r^p \cdot n_c^p \geq d_r \ \forall r \in D \quad (11)$$

$$n^p = \sum_{\forall c \in C} n_c^p \ \forall p \in P \quad (12)$$

-continued $$s_j \geq \sum_{\forall p \in P} n^p \cdot \pi_j^p \ \forall \ j \in S \qquad 13$$

The objective function minimizes the total cost of placing spare capacity in the network. For simplicity, we can equate $c_j$ with the length of the span as drawn in the network graph, and in general, $c_j$ represents costs of fibre, rights-of-way, amplifiers, etc. The constraints in (11) ensure that for each demand relation, r, a sufficient number of FIPP p-cycles are assigned to protect all selected DRSs of which the working route of demand r is a member. Equation (12) calculates the total number of copies of FIPP p-cycle p as equivalent to the sum of the numbers required for each selected DRS individually. Finally, (13) ensures that sufficient spare capacity exists to build the p-cycles selected by the design.

Joint, Modular Design of FIPP P-Cycle Networks Using the DRS Approach

In this section, we extend the DRS based approach to consider multiple eligible routes for each demand. We now build in the ability to include up to 10 eligible working routes per demand. The DRS generation algorithm now generates DRSs from this master set of eligible routes. We also add in the ability to consider modularity and economy of scale effects as in W. D. Grover, J. Doucette, "Advances in optical network design with p-cycles: Joint optimization and pre-selection of candidate p-cycles," Proc. *IEEE LEOS Summer Topicals* 2002, Mont Tremblant, Québec, Canada, 15-17 Jul. 2002, pp. 49-50.

Sets

S is the set of all spans in the network, and is indexed by i for a failed span, and j for a surviving span.

C is the set of all eligible DRSs, and is indexed by c.

D is the set of demand relations, indexed by r.

M is the set of modules, indexed by m.

$C_q \in C$ is the set of all DRSs that contain working route q, and is indexed by c.

P is the set of eligible cycles, indexed by p.

$P_c \in P$ is the set of eligible cycles that can protect DRS c, and is indexed by p.

$Q^r$ is the set of eligible working routes available for working paths of demand relation r and is indexed by q.

Parameters $d_r$ is the number of unit demands in the bundle of demand relation r.

$x_q^p \in \{0,1,2\}$ encodes the relationship between the $q^{th}$ working route and eligible p-cycle p. $x_q^p=1$ if working route q's end-nodes are on cycle p and the route passes over at least one span on cycle p, $x_q^p=2$ if working route q's end-nodes are on cycle p and its working route straddles cycle p; and $x_q^p=0$ otherwise.

$\pi_j^p \in \{0,1\}$ encodes a cycle's constituent spans. $\pi_j^p=1$ if cycle p crosses span j, and $\pi_j^p=0$ otherwise.

$\zeta_j^{r,q}$ Takes the value of 1 if the $q^{th}$ working route for the demand pair r goes through span j.

$\Omega^q$ Takes the value of 0 if the $q^{th}$ working route does not belong to any eligible DRS. This is necessary because not all routes may be chosen as part of at least one DRS.

$Z^m$ Capacity of $m^{th}$ module type.

$C^m$ is the cost of a single module of type m.

$c_j$ is the cost of span j.

Decision Variables $s_j \geq 0$ is the spare capacity placed on span j.

$w_j \geq 0$ is the spare capacity placed on span j.

$n_c^{p,q} \geq 0$ is the number of unit-capacity copies of cycle p used as a FIPP p-cycle to protect working route q as part of DRS c.

$n_c^p \geq 0$ is the number of unit-capacity copies of cycle p used as a FIPP p-cycle to protect DRS c.

$n^p \geq 0$ is the total number of unit-capacity copies of cycle p used as a FIPP p-cycle for all DRSs.

$g^{r,q}$ The number of working capacity units on the $q^{th}$ route to satisfy the demand between node pair r.

$t_j^m$ Number of modules of type m placed on span j.

The ILP formulation of the DRS-based FIPP p-cycle network joint working and spare design model (FIPP-DRS-JCP) is as follows:

FIPP-JCP-DRS:

$$\text{Minimize} \sum_{m \in M} \sum_{\forall j \in S} (c_j \cdot C^m \cdot t_j^m) \qquad 14$$

Subject to:

$$\sum_{q \in Q^r} g^{r,q} \cdot \Omega^q \geq d^r \ \forall \ r \in D \qquad 15$$

$$\sum_{r \in D} \sum_{q \in Q^r} \zeta_j^{r,q} \cdot g^{r,q} \leq w_j \ \forall \ j \in S \qquad 16$$

$$\sum_{\forall c \in C_q} \sum_{\forall p \in P_c} x_q^p \cdot n_c^{p,q} \geq g^{r,q} \quad \begin{array}{l} \forall \ r \in D \\ \forall \ q \in Q^r \end{array} \qquad 17$$

$$n_c^p \geq n_c^{p,q} \quad \begin{array}{l} \forall \ r \in D \\ \forall \ q \in Q^r \\ \forall \ c \in C_q \\ \forall \ p \in P_c \end{array} \qquad 18$$

$$n^p = \sum_{\forall c \in C} n_c^p \ \forall \ p \in P \qquad 19$$

$$s_j \geq \sum_{\forall p \in P} n^p \cdot \pi_j^p \ \forall \ j \in S \qquad 20$$

$$w_j + s_j \leq \sum_{m \in M} t_j^m \cdot Z^m \ \forall \ j \in S \qquad 21$$

The objective function in (14) minimizes the total modular cost of placing spare and working capacity in the network. For simplicity, we can equate $c_j$ with the length of the span as drawn in the network graph, and in general, $c_j$ represents costs of fibre, rights-of-way, amplifiers, etc. $C^m$ represents the cost of module m. $C^m$ is used to include economy of scale effects. Constraints (15) and (16) are the working routing constraints. Constraint (15) ensures that the entire demand bundle r is fully routed along one or more of the q working routes available for demand bundle r. Constraint (16) then ensures that sufficient working capacity is placed on the network spans to support all working routing over that span simultaneously. Constraint (11) then places sufficient number of FIPP p-cycles to protect all selected DRSs. Equation (12) calculates the total number of copies of FIPP p-cycle p as equivalent to the sum of the numbers required for each selected DRS individually. There is no requirement that different DRSs be mutually disjoint. Thus a single cable cut may affect multiple working routes that belong to different DRSs. Finally, (13) ensures that sufficient spare capacity exists to build the p-cycles selected by the design. As a special relaxation, we can relax $n_c^{p,q}$ and $n_c^p$ because the number of p-cycles that will actually be built is bounded by $n^p$ which is integral. Thus $n_c^{p,q}$ and $n_c^p$ are also implicitly integers.

Experimental Setup

Experimental Setup For FIPP-SCP ILP Model

Figure 11:
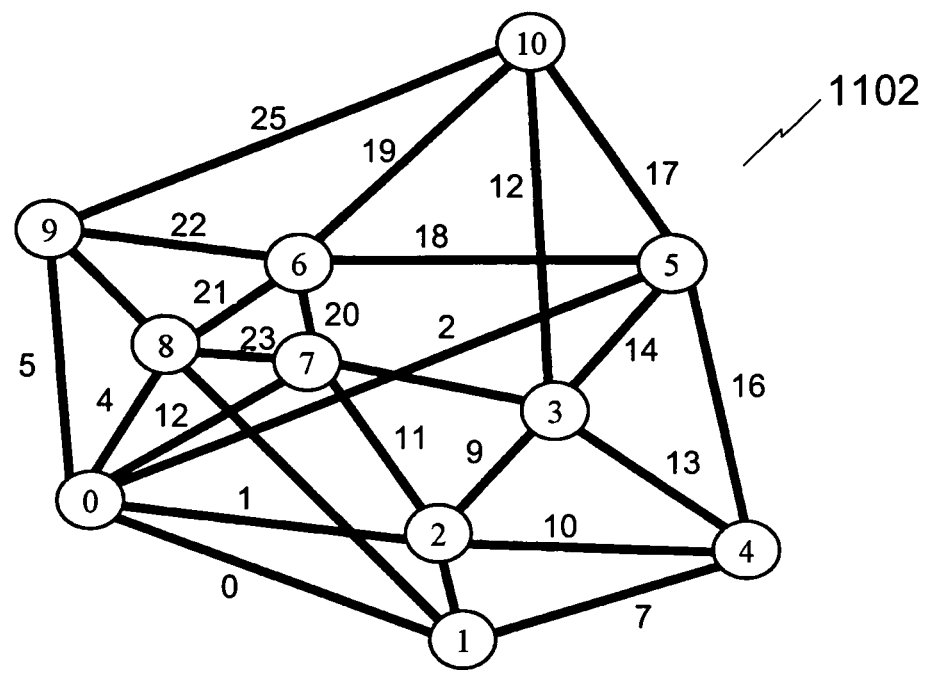

The FIPP p-cycle design model above model was coded in AMPL™ and solved using CPLEX™ on a dual Opteron Windows 2000 machine with 1 Gig of RAM. The test network used is the COST239 European network from P. Batchelor et al., "Ultra high capacity optical transmission networks: Final report of action COST 239," *Faculty of Electrical Engineering and Computing*, University of Zagreb, 1999, reproduced in FIG. 11 as network 1102 and indicates span numbers for reference in the discussion later. The cost of each span is assumed to be 1, so in this case the minimum cost design is the same as the minimum capacity design. Network 1102 has 11 nodes labelled 0 to 10 and 26 spans labelled 0 to 25. A pre-processing program written in C++ initially produces a list of candidate cycles in the graph. There are somewhat over 3000 distinct simple cycles possible in the Cost239 network 1102 and we choose the 1000 longest cycles as candidate p-cycles. Working capacity is routed via shortest paths and we then pre-calculate the $x_r^p$, $\pi_j^p$ and $\partial_{m,n}$ parameters based on the cycle and working routing information. This information is provided as input to the AMPL-CPLEX solver. The demand matrix is varied for different test cases from a sparse 19 demands to the maximum possible 55 demands in the 11-node COST239 network 1102. The 19 and 27-demand test cases have demands between randomly chosen node pairs. We will later examine in detail the 19-demands test case, and hence we list all the 19 demands, their end-nodes and details of their working routing Table 1. The 27 demand test case also has randomly generated demands from the total of 55 possible demands. For all test cases, each demand is exactly 2 units. SBPP benchmark designs are based on the optimal SBPP-SCP design model with all routes of equal hop-length which are disjoint from the working route included as backup route candidates for each SBPP primary route. Ordinary span-protecting p-cycle SCP reference designs were also produced based on an optimal design model with a 1000 shortest cycles as input. The demand matrix and working routing was the same for all the different test cases. Overall the FIPP-SCP designs took the longest time to solve—which is as expected because of the higher complexity. The SBPP and p-cycle benchmark designs are solved to within 1% MIPGAP. The FIPP p-cycle designs were also set at 1% MIPGAP, but despite running for over 2 days and multiple trials and variable relaxations, the integer feasible solutions were between 30% and 60% away from the fully-relaxed lower bound. This means that good feasible designs were obtained by the AMPL-CPLEX optimization, but we do strictly know only that these designs are within 30% to 60% of optimal. They are, however, probably fairly close to optimal solutions because it is generally known that in problems with many 1/0 variables the fully relaxed LP lower bound is usually quite loose. In any case, sub-optimality only works against the claims we make for FIPP p-cycle efficiency in the comparative design results. At present, our concern is not about the run time, but the properties of this new network architecture itself, using ILP as a tool to simply to reveal its intrinsic efficiency compared to other schemes.

But even with this handicap, the FIPP p-cycles were remarkably capacity efficient. In the 19 and 55 demand test cases, FIPP p-cycles outperformed span p-cycles. In the 27 demand test case, the result was very close. The results for the SBPP design and the FIPP-SCP designs were also remarkably close together.

TABLE 1

DEMAND MATRIX FOR TEST NETWORK
EXPERIMENTAL SETUP FOR FIPP-SCP-DRS ILP MODEL

| Demand | End Nodes | Spans in working route |
|---|---|---|
| 0 | (0, 1) | 0 |
| 1 | (0, 4) | 0, 7 |
| 2 | (0, 7) | 3 |
| 3 | (0, 10) | 2, 17 |
| 4 | (1, 4) | 7 |
| 5 | (1, 7) | 0, 3 |
| 6 | (1, 10) | 6, 9, 12 |
| 7 | (2, 5) | 1, 2 |
| 8 | (2, 8) | 1, 4 |
| 9 | (3, 4) | 13 |
| 10 | (3, 7) | 15 |
| 11 | (3, 10) | 12 |
| 12 | (4, 7) | 10, 11 |
| 13 | (4, 10) | 13, 12 |
| 14 | (5, 8) | 2, 4 |
| 15 | (6, 7) | 20 |
| 16 | (6, 10) | 19 |
| 17 | (7, 10) | 15, 12 |
| 18 | (9, 10) | 25 |

To obtain a strictly optimal FIPP p-cycle network design solution with the FIPP-SP-DRS-ILP model, the solver would strictly require all possible DRSs as input. This of course combinatorially quite complex. Consider that a network with n nodes has $K=n(n-1)/2$ node pairs to exchange demand. There are potentially $^KC_2$ possible combinations of 2-route groups, $^KC_3$ possible 3-route groups, and so on, for a total of $$\sum_{\forall i \in \{1...n\}} {}^KC_i$$

if we require node-disjointness, or $$\sum_{\forall i \in \{1...s\}} {}^KC_i$$

if span-disjointness is sufficient (where s is the number of spans in the network). It is an intractable problem, of $O(n^2!)$, just to enumerate all possible combinations of routes from which to select the DRSs, and this is only if each demand relation considers a single eligible working route.

We therefore use an algorithmic approach to partially enumerate a promising and practically-sized DRS set. The basic algorithm is as follows:

```
GenerateDRSs( ) {
    Initialize DRSSet
    For each working route r{
        Unmark all working routes
        Mark working route r
        While DRS c not complete {
            Randomly select unmarked route, x
            Mark working route x
            If x is disjoint from c {
                Add working route x to DRS c
            }
            If no unmarked working routes remain {
                DRS c is complete
            }
        }
    }
```

-continued

```
    Add DRS c to DRSSet
  }
  Return DRSSet
}
```

The implementation we tested for the results below, ran the above algorithm ten times, so that each working route, r, was included in at least ten individual DRS candidates. We also added a random termination function such that each time through the algorithm, there was an increasing probability that we would mark the current DRS as complete after each new route was added to it. The result is that some DRSs include a many disjoint routes (as many as 20), while others include as few as two or three. We also add to the set of DRSs one additional "ultimate recourse" DRS associated with each node-pair individually. These DRSs each contain only the one shortest working route for each node pair individually. This allows that the model is able to select a FIPP p-cycle solely for the protection of a single highly-sized working route, if that is necessary for feasibility or optimality. Then for each DRS in this set of DRSs, we find the 10 shortest eligible cycles that join all end-nodes of the DRS (if ten are feasible). In doing this we are careful to allow any specific eligible cycle to protect other DRSs as feasible, not just the one for which it was enumerated.

The ILP model was implemented in AMPL 9.0 and solved using the CPLEX 9.0 MIP solver on a dual-processor AMD Opteron 242 PC with 1 GB of RAM running Windows 2000. On this platform FIPP-DRS runtimes were in the order of seconds or a few minutes for most test cases, benchmark comparison SBPP runtimes were several minutes, and p-cycle runtimes were several seconds at most. The test case networks used is a 15-node family of related networks and their associated demand matrix (full mesh of demands with each node pair exchanging a uniform random demand from 1 to 10) from J. Doucette, "Advances on Design and Analysis of Mesh-Restorable Networks," Ph.D. Dissertation, University of Alberta, Edmonton, AB, Canada, 3 Dec. 2004. The network family is headed by a master network with 30 spans (for an average nodal degree of 4.0). Each other member of a family is obtained by successively applying individual pseudo-random span removals while keeping all nodal positions fixed. Any one network in the family is therefore identical to the next higher-degree network in the family except that one span has been removed. The same demand matrix is used for each individual member of the family. In all cases, working routing is via shortest paths, and all variables are strictly integer. Benchmark SBPP and p-cycle designs were produced using the same ILP models as described in the above referenced Ph.D. dissertation, and with the same design parameters: SBPP designs considered the 10 shortest backup routes for each demand relation, and the p-cycle designs had 1000 eligible cycles (the 1000 shortest that can possibly be drawn in the graph). FIPP-DRS and SBPP results are based on full CPLEX terminations with optimality gap settings of 0.02, or in other words, all solutions are solved to be within 2% of optimal given the specified inputs. p-Cycle results were obtained with optimality gap settings of 0.0001 (within 0.01% of optimal).

Experimental Setup for FIPP-JCP-DRS ILP Model

For this model we only partially enumerate the set of DRSs for the same reasons as discussed in the previous section. The creation of candidate DRSs is based on a heuristic algorithm that is a modified version of that for the FIPP-SCP-DRS ILP model.

The algorithm is as follows:

```
GenerateDRSs( ) {
  Initialize DRSSet
  Initialize EligibleRouteSet
  For each Demand r {
    Generate n shortest working routes
    between the nodes of r and add them to
    the EligibleRouteSet
  }
  For each Demand r {
  For Number of DRSs per Demand needed {
    Add shortest route of Demand r to DRS c
    While DRS c not complete {
      Randomly select a working route x
      from the EligibleRouteSet
      If x is disjoint from c {
        Add working route x to DRS c
      }
    }
    Add DRS c to DRSSet
  }
  Return DRSSet
}
```

In the nominal case, for each demand, we found the five shortest eligible working routes by length and grouped them into one eligible working route set (EligibleRouteSet). The shortest working route for each demand was taken as the starting point for a sample DRS and additional routes (from the eligible working route) were chosen such that they are disjoint from all the routes already in the DRS. We repeated this process 10 times for each demand and created 10 eligible DRSs for each demand. This also ensured that the shortest working route for the demand belonged to at least 10 DRSs in the final eligible DRS set. For each DRS we then found the five shortest cycles that pass through the collective set of end-nodes of the working routes in the DRS. To the set of eligible DRSs generated using the GenerateDRSs algorithm, we added a set of DRSs that contained the single shortest working route for each demand in the demand matrix. This was done to allow the solver to place smaller p-cycles to protect large demand bundles if that results in a net decrease in network cost. A random termination function was added to the Generate DRSs algorithm. This randomly terminates the DRS formation loop, even if the DRS is not complete. This resulted in a selection of cycles of various sizes.

The ILP model was implemented in AMPL 9.0 and solved using the CPLEX 9.0 MIP solver on a quad-processor Sun V480 SPARC server with 16 GB of RAM. The test case network used is the COST239 network 1102 in FIG. 11. We considered 15 unique demand bundles between randomly selected node pairs and in all cases the demand bundle is exactly 4 units. Span costs are equal to the geographic distance between their end-nodes on the network graph. For the results below, we varied the number of routes per DRS, number of eligible cycles per DRS and the number of eligible working routes per demand one at a time and studied the effect on the network costs and the spare to working capacity redundancies. Each of the tests were repeated five times with the input set of DRSs generated randomly for each run. Exact data points are plotted individually and an average is drawn as a line in the graph for all the test cases. All variables are restricted to be integers. All results are based on full CPLEX terminations with optimality gap settings of 0.01, or in other words, all solutions are solved to be within 1% of optimal given the specified inputs. Runtimes were not recorded but they were in the order of seconds or minutes for most test cases, with none running over 2 hours.

Figure 12:
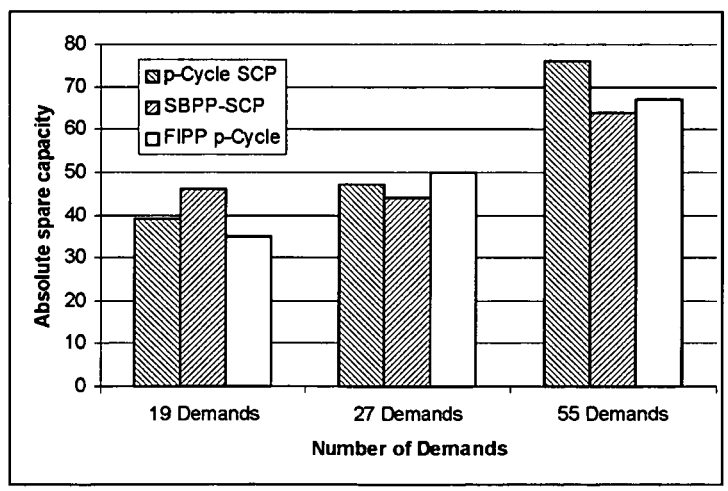
FIG. 12 is a graph comparing SBPP, p-cycle, and FIPP p-cycle results.

Results and Discussion
  FIPP-SCP
  Numerical results for the comparison of FIPP-SCP, span p-cycle SCP and SBPP spare capacity are shown in FIG. 12. We can see that from a capacity efficiency perspective, FIPP p-cycles differ very little from SBPP, sometimes being better, sometimes slightly worse, but as expected in all cases, performing better than span protecting p-cycles. The demonstration of even just similar spare capacity requirements as SBPP is very significant, however, as it means that the other main advantage, full pre-connection, can be exploited without any significant penalty ensuing regarding capacity requirements.

To both validate and portray the design results, and to further bring out the simplicity of FIPP p-cycles, we arbitrarily picked the 19 demand COST239 test case and draw out the FIPP p-cycles that are in the solution. The completely restorable design was based on only five FIPP p-cycles shown in FIGS. 13 through 17, labelled 1302, 1402, 1502, 1602, and 1702, respectively. Each figure shows the actual p-cycle, with the working demands constructed using thin arrow-headed lines, and a simplified logical abstraction of each p-cycle and the end-to-end node demand pairs that it protects.

Figures 13A, 13B:
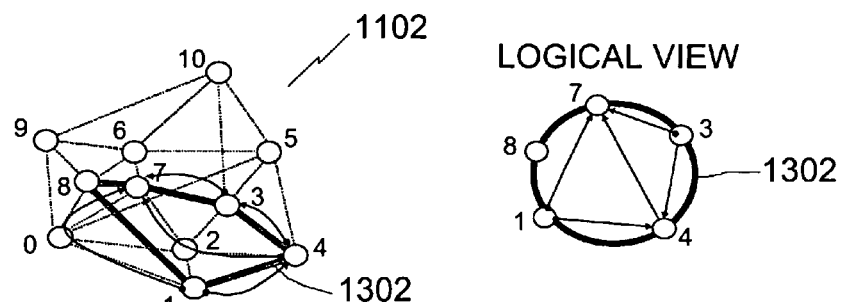
FIG. 13A-13B is a potential FIPP p-cycle for the network of FIG. 11 and its logical view.
Figure 13C:
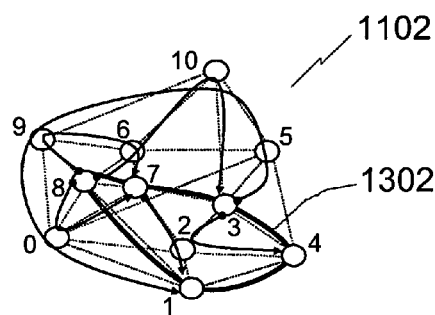
FIG. 13C depicts potential additional loading capability for the network of FIG. 11 due to the FIPP p-cycle of FIG. 13A.

The cycle A in FIG. 13A protects up to 2 units of demand for demand relations 9, 5, 4, 12, 10. The working routing is shown using thin arrow-headed lines. Notably if p-cycle A were to be used as a span protecting p-cycle—its a priori Efficiency is only 1. However, on using the cycle as a FIPP p-cycle, with AE now defined in terms of the number of end-to-end demand flows it can protect, the AE can be as high as 2.6 for the combination of demands shown in FIG. 7(*c*). Another observation is that the number of demands that the FIPP p-cycle can protect can be increased, if the working routes are deviated from shortest path. This suggests not surprisingly that a joint model that simultaneously optimizes the working capacity and p-cycle placements may yield considerably more efficient designs by having even greater latitude over the DRS of routes that are chosen to associate with each candidate p-cycle. The same FIPP p-cycle in FIG. 13A can 'soak up' more demands without any increase in spare capacity.

Figures 14A, 14B:
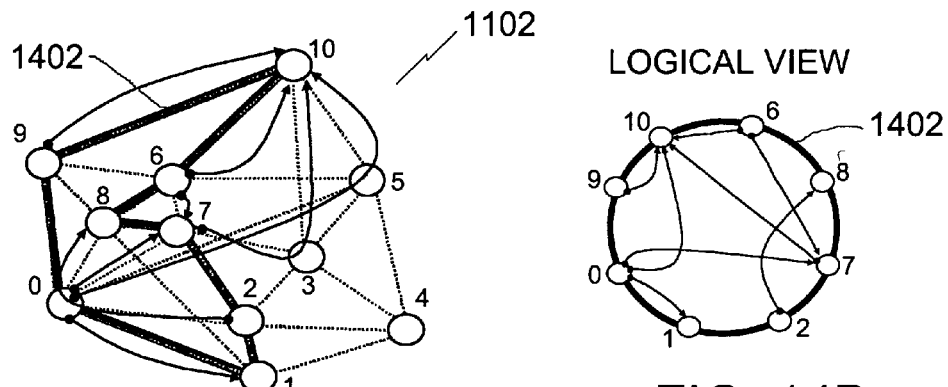
Figures 15A, 15B:
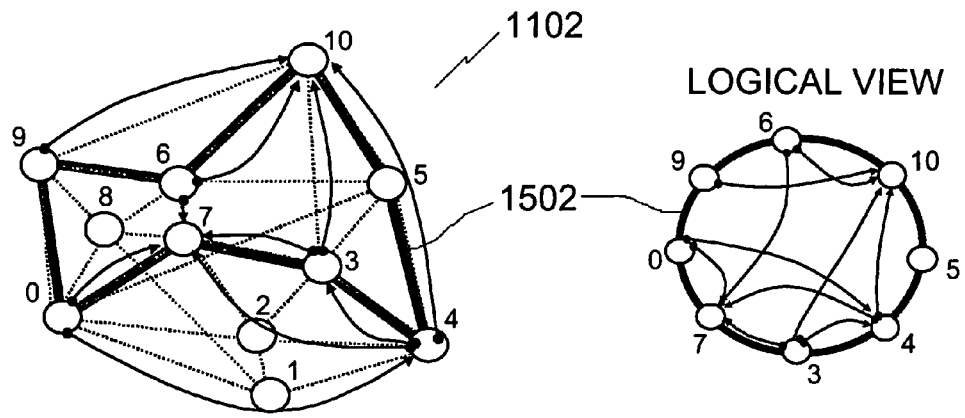
Figures 16A, 16B:
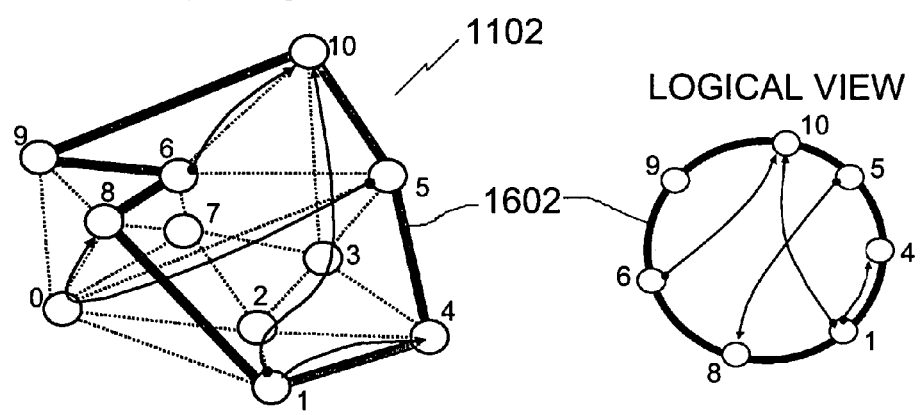
Figures 17A, 17B:
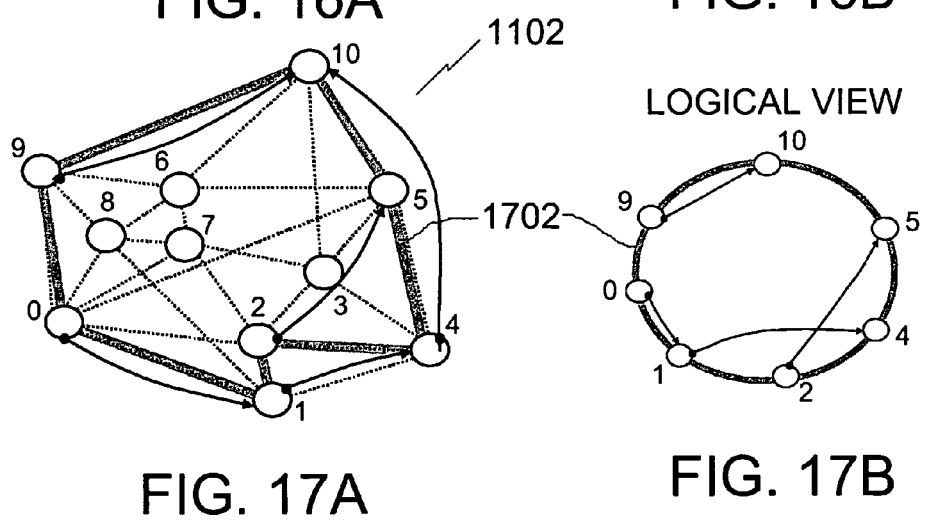
Figures 18A, 18B:
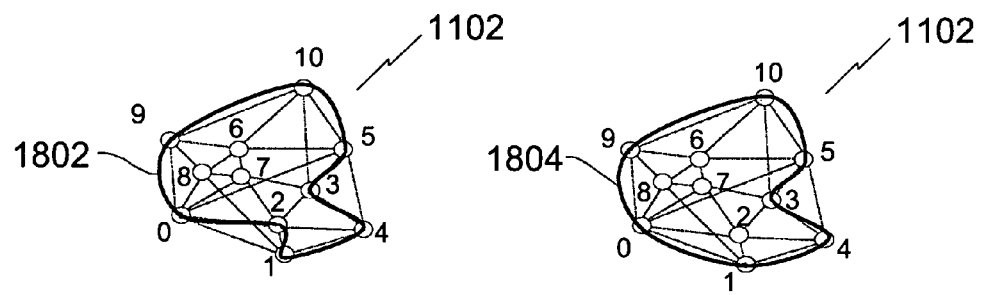
FIG. 18A-18D is a solution set of conventional span protecting p-cycles for the network of FIG. 11 for the same test case input data that is used to obtain the results in FIG. 13A to FIG. 17B.
Figures 18C, 18D:
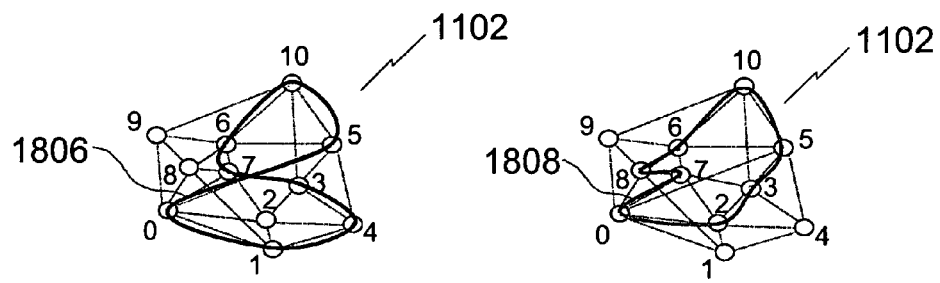

In the same way the p-cycle of FIG. 14A protects up to 2 units of demand for demand relations 8, 2, 3, 18, 17, 16, 15, 0 in Table 1. The FIPP p-Cycle of FIG. 15A protects demands from demand relations 9, 2, 18, 16, 15, 12, 11, 10, 1. The p-Cycle of FIG. 16A protects demands from demand relations 6, 4, 16, 14 and the p-cycle of FIG. 17A protects demands on demand relations 7, 4, 18, 13.

On inspection of FIGS. 16A and 16B, and FIGS. 17A and 17B we can see that the p-cycles 1602 and 1702 do not give the impression of being very heavily loaded with protection relationships. In the present case, despite this seeming waste, the overall solution still requires less absolute spare capacity than the span p-cycle design. For interest and comparative purposes the optimal span protecting p-cycle solution for the very same networks and set of working demands and routes is shown in FIGS. 18A through 18D with cycles 1802, 1804, 1806 and 1808, respectively.

By simple inspection it is not clear if there are any strategies that could be used to convert span p-cycles to FIPP p-cycles. We ran a quick test case where we limited the FIPP-SCP solver to choosing from the 4 span p-cycles 1802, 1804, 1806 and 1808 from FIGS. 18A through 18D, respectively. It did result in an optimal FIPP solution quickly (there is no guarantee that a span p-cycle set can produce a feasible FIPP solution), but did not improve on the capacity efficiency of span p-cycles. This suggests, however, a possibly powerful strategy for assisting the ILP solution of the FIPP p-cycle network design problem: first solve the generally much easier regular p-cycle design problem and use its number of p-cycles and objective function values as guiding additional bounds for the FIPP p-cycle ILP solution. Since the current test network is rather small, it is also not clear whether FIPP generally tends to choose larger or smaller cycles. In fact if we inspect p-cycle A from the FIPP solution in FIG. 13, we can see that it does not have any straddlers at all. Chances of cycle A actually being selected as a span p-cycle would therefore have been very low, but this same cycle is of merit in FIPP p-cycles because it does have good straddling relationships when allowed to operate to protect paths solely on an end-to-end path basis.

Figure 19:
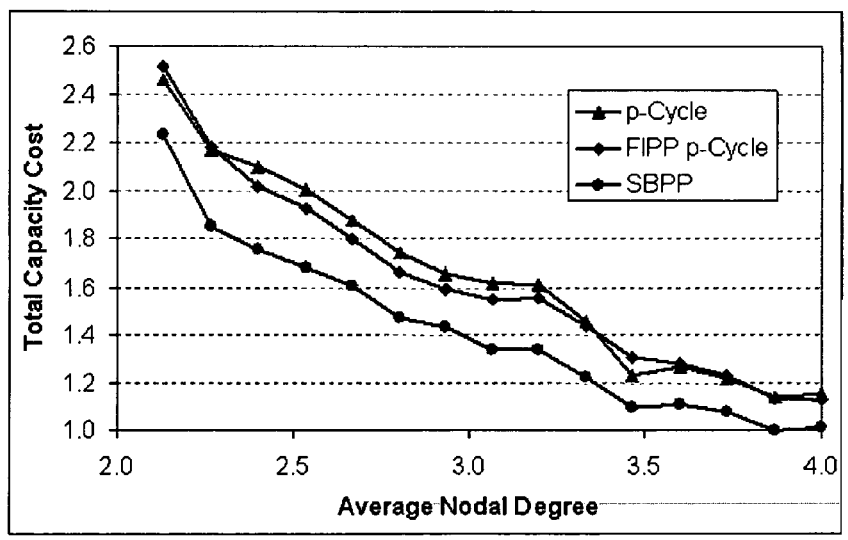
FIG. 19 is a graph of the total capacity costs of FIPP p-cycle network designs using the FIPP-DRS ILP model.

FIPP-SCP-DRS
  Experimental results show that using the FIPP-SCP-DRS ILP model, with a heuristic to populate its candidate DRS set, we are able to produce FIPP p-cycle network designs that are more capacity-efficient than even strictly optimal conventional p-cycle network designs by as much as 6%, as shown in FIG. 19. Each data point in FIG. 19 corresponds to the optimally designed solution of the test case network with the indicated average nodal degree using the indicated design method. That is to say that the CPLEX terminations were optimal solutions for the problem models and data given them. This is separate from absolute suboptimality that may still be imputed from the restricted datasets given the corresponding problems. Although the FIPP p-cycle designs are the most sub-optimal by nature of the DRS-limiting heuristic used, they come within 10-18% of the capacity of SBPP network designs which have essentially no significant limitation on their global optimality (ILP termination and dataset provided).

Figure 20A:
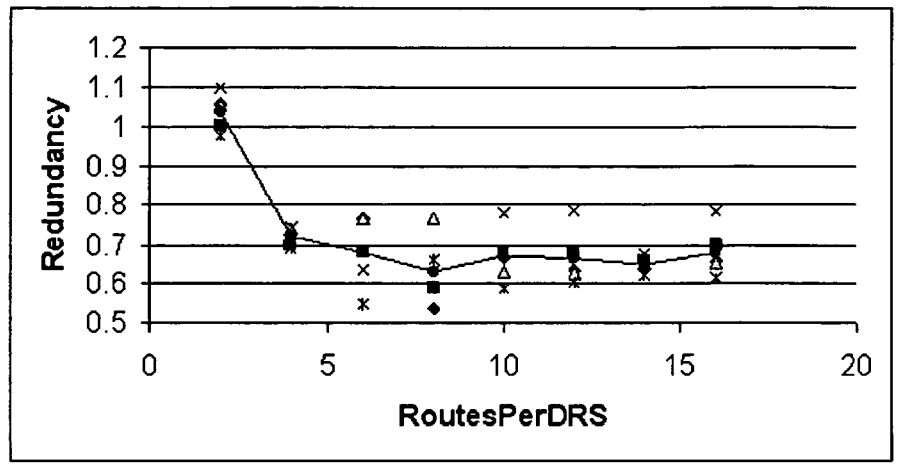
FIG. 20A is a graph of the redundancy versus routes per DRS.
Figure 20B:
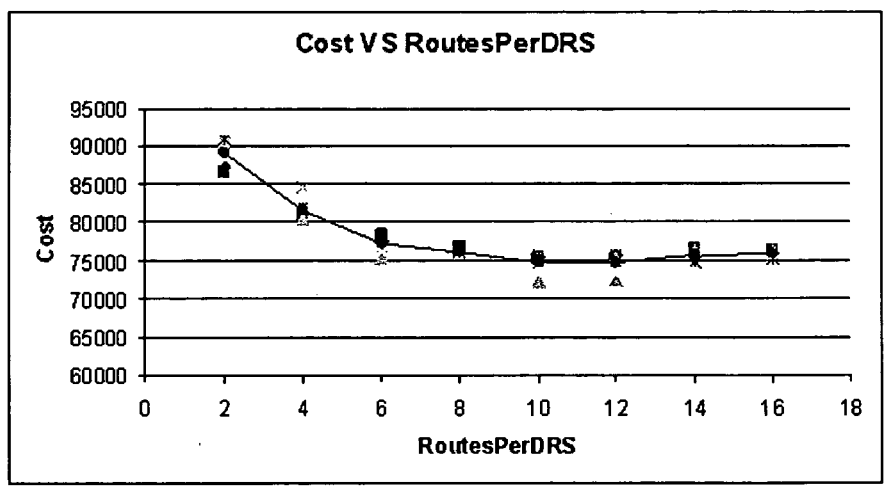
FIG. 20B is a graph of the design cost versus routes per DRS.

FIPP-JCP-DRS
  For this set of experiments, we varied the maximum number of routes in a single DRS from 2 to 16. Up to five shortest routes were provided for each demand and the shortest working route for each demand was included in at least 10 eligible DRSs. For each DRS the five shortest eligible cycles were provided as input. Since DRSs are chosen randomly, we conducted five trials for each experiment and plotted the average over all the five tests. The redundancy results are in FIGS. 20A and 20B. We can see that, on average, as the maximum number of routes allowed per DRS is increased, spare to working capacity redundancy decreases. We also observe a threshold effect where allowing more than 6 routes per DRS for the COST239 network improves the design cost only incrementally.

Figure 21:
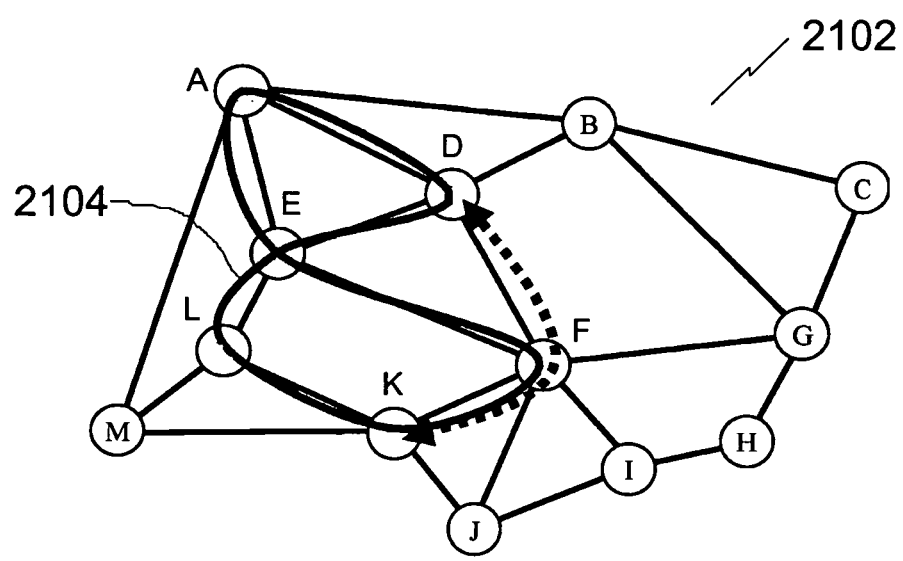
FIG. 21 is an example of a non-simple FIPP p-cycle.

Non-Simple FIPP P-Cycles (NS-FIPPS).
  We now describe another offshoot of the fundamental FIPP concept—non simple cycles, based on the non-simple span p-cycle concept. Non-simple cycles are defined as cycles that can go over any network node or span more than once. We give an illustration of a span disjoint NS-FIPP in network 2102 of FIG. 21 that has nodes A through M, where a non simple cycle A-D-F-K-L-E-D-A labelled 2104 passes through node E twice (although using different line cards and slots). We now can see easily that the same failure restoration mechanism as shown in FIG. 10D can be used to protect the example demand K-D from any span or node failure along its path.

NS-FIPPs can also be designed using the algorithms described previously. At the end of the random demand clustering, we get a group of compatible demand sets for which we provided a p-cycle for protection. In NS-FIPPs we provide a minimum Hamiltonian trail for the sub graph defined by the nodes of the Compatible Demand Set as a protection option. This would mean that the NS-FIPP could loop over nodes and spans multiple times if it is the minimum structure, and despite the apparent complexity of the protection structure, the protection switching would remain unchanged.

A comparison between the FIPP p-cycle approach described in this document and other techniques is shown in Table 2 below

TABLE 2

A COMPARISON OF FIPP P-CYCLES TO EXISTING TECHNIQUES

| Attribute | Span Restoration | Path Restoration | Span p-Cycles | Flow P-cycles | SBPP | p-Trees | PXTs | FIPP p-Cycles |
|---|---|---|---|---|---|---|---|---|
| Capacity Efficiency | good | best | good | ~best | ~best | bad | (not well characterized yet) | ~best |
| Individual protection path known in advance? | no | no | YES | YES but failure specific | YES | no | YES | YES |
| Operational Complexity | moderate | high | LOW | high | high | high | high | low |
| Design complexity | low | high | low | high | high | high | very high | low |
| Assured restoration outcomes | yes | yes (with MCMF-like PR) | YES | YES | YES | YES | ~YES | YES |
| Only two Nodes act (per path restored) | no | no | YES | YES | NO | YES | YES | YES |
| Only End nodes act | no | no | no | no | no | no | no | YES |

While illustrative embodiments have been illustrated and described, it will be appreciated that various changes can be made therein without departing from the spirit and scope of the invention.

The invention claimed is:

1. A telecommunications network, comprising:
   plural nodes connected by plural spans and arranged to form a mesh network;
   at least one pre-configured cycle of spare capacity being established in the mesh network, the pre-configured cycle including plural nodes of the mesh network and being pre-connected in readiness for a span or node failure in advance of the span or node failure; and
   the plural nodes of the pre-configured cycle being configured to protect a set of working paths by providing one or more protection paths on the pre-configured cycle for each working path of the set of working paths such that for each pair of working paths in the set of working paths either the paths of the pair have no link in common with each other or the one or more protection paths on the pre-configured cycle for each working path in the pair have no link in common with the one or more protection paths on the pre-configured cycle for the other working path in the pair, the working paths each having end nodes on the pre-configured cycle, and at least one working path in the set of working paths including at least one intermediate node between end nodes of the working path.

2. The telecommunications network of claim 1 in which the plural nodes of the pre-configured cycle are configured to protect a set of working paths that have no link in common between any pair of paths in the set of working paths.

3. The telecommunications network of claim 1 in which, for each working path in the network, there exists a pre-configured cycle of space capacity configured to protect the working path in case of failure of the working path, the working path having end nodes on the pre-configured cycle.

4. The telecommunications network of claim 1, where the pre-configured cycle is a non-simple pre-configured cycle.

5. A method of operating a telecommunications network, the telecommunications network comprising plural nodes connected by plural spans and arranged to form a mesh network, the method comprising the steps of:
   establishing at least one pre-configured cycle of spare capacity in the mesh network, the pre-configured cycle including plural nodes of the mesh network and being pre-connected in readiness for a span or node failure in advance of the span or node failure;
   selecting a set of working paths, each working path in the set of working paths having no link in common with any other working path in the set of working paths and each working path in the set of working paths having end nodes on the pre-configured cycle, at least one working path in the set of working paths comprising an intermediate node between the end nodes of the at least one working path; and
   configuring the plural nodes of the pre-configured cycle, in advance of a failure, to protect the working paths in the set of working paths by providing one or more protection paths on the pre-configured cycle for each working path of the set of working paths.

6. The method of claim 5, where the pre-configured cycle of spare capacity is provided by:
   identifying a set of working paths within the mesh network, each working path in the set of working paths having no link in common with any other working path in the set of working paths;
   identifying the spare capacity of the pre-configured cycle required to restore all working flows for all spans and nodes subject to failure in the set of working paths; and
   providing spare capacity along the pre-configured cycle sufficient to restore all working flows.

7. The method of claim 6, further comprising the step of routing working flows between intersecting nodes along working paths to optimize network performance.

8. The method of claim 5, where establishing the pre-configured cycle and configuring the plural nodes of the preconfigured cycle to protect the working paths in a set of working paths comprises the steps of:

selecting a set of working paths within the mesh network, each working path in the set of working paths having no link in common with any other working path in the set of working paths and each working path in the set of working paths comprising two end-nodes;

selecting a candidate pre-configured cycle to protect the working paths in the set of working paths, the candidate pre-configured cycle comprising the end-nodes of the working paths in the set of working paths;

evaluating the candidate pre-configured cycle and the set of working paths; and repeating the selecting a set of working paths within the mesh network, the selecting a candidate pre-configured cycle, and the evaluating the candidate pre-configured cycle and the set of working paths until a suitable pre-configured cycle is selected.

9. The method of claim 5, where establishing the pre-configured cycle and configuring the plural nodes of the pre-configured cycle to protect a set of working paths comprises the steps of:

selecting a candidate pre-configured cycle;

selecting a set of working paths within the mesh network, each working path in the set of working paths having no link in common with any other working path in the set of working paths and each working path comprising two end nodes within the candidate pre-configured cycle;

evaluating the candidate pre-configured cycle and the set of working paths; and repeating the selecting a candidate pre-configured cycle, the selecting a set of working paths within the mesh network, and the evaluating the candidate pre-configured cycle and the set of working paths until a suitable set of working paths and a suitable pre-configured cycle are selected.

10. The method of claim 9 where the candidate pre-configured cycle is selected from a set of candidate pre-configured cycles.

11. A telecommunications network, comprising:

plural nodes connected by plural spans and arranged to form a mesh network;

protection cycles of spare capacity in the network connected in readiness for span or node failures, prior to any failure;

each protection cycle providing restoration paths for a set of demands with end nodes on the protection cycle, at least one demand protected by at least one protection cycle including at least one intermediate node between the end nodes of the demand; and the set of demands protected by a single protection cycle having no link in common in their working routing.

12. A telecommunications network, comprising:

plural nodes connected by plural spans and arranged to form a mesh network;

protection cycles of spare capacity in the network connected in readiness for span or node failures, prior to any failure;

each protection cycle providing restoration paths for a set of demands with end nodes on the protection cycle, at least one demand protected by at least one protection cycle including at least one intermediate node between the end nodes of the demand; and the restoration paths for the set of demands protected by a single protection cycle having no link in common.

13. The telecommunication network of claim 1 in which the plural nodes of the pre-configured cycle are configured to protect a set of working paths by providing one or more protection paths on the pre-configured cycle for each working path of the set of working paths such that for each pair of working paths in the set of working paths either the paths of the pair have no link in common with each other and no intermediate node in common with each other or the one or more protection paths on the pre-configured cycle for each working path in the pair have no link in common and no intermediate node in common with the one or more protection paths on the pre-configured cycle for the other working path in the pair, the working paths each having end nodes on the pre-configured cycle.

14. The telecommunications network of claim 2 in which the plural nodes of the pre-configured cycle are configured to protect a set of working paths that have no link in common and no intermediate node in common.

15. The method of claim 5 in which each working path in the set of working paths has no link in common and no intermediate node in common with any other working path in the set of working paths.

16. The telecommunications network of claim 11 in which the set of demands protected by a single protection cycle have no link in common and no intermediate node in common in their working routing.

17. The telecommunications network of claim 12 in which the restoration paths for the set of demands protected by a single protection cycle have no link in common and no intermediate node in common.

* * * * *